US011225323B2

(12) United States Patent
Stanney et al.

(10) Patent No.: US 11,225,323 B2
(45) Date of Patent: Jan. 18, 2022

(54) CENTERLINE TILTROTOR

(71) Applicant: Bell Textron Inc., Fort Worth, TX (US)

(72) Inventors: Keith Alan Stanney, Dallas, TX (US); Steven Ray Ivans, Ponder, TX (US); Brent Chadwick Ross, Flower Mound, TX (US); Troy Bushmire, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 113 days.

(21) Appl. No.: 16/541,561

(22) Filed: Aug. 15, 2019

(65) Prior Publication Data

US 2021/0047029 A1   Feb. 18, 2021

(51) Int. Cl.
| | |
|---|---|
| *B64C 27/28* | (2006.01) |
| *B64C 17/02* | (2006.01) |
| *B64C 3/56* | (2006.01) |
| *B64C 27/50* | (2006.01) |
| *B64C 27/26* | (2006.01) |

(Continued)

(52) U.S. Cl.
CPC ............... *B64C 27/28* (2013.01); *B64C 3/56* (2013.01); *B64C 17/02* (2013.01); *B64C 27/26* (2013.01); *B64C 27/50* (2013.01); *B64C 27/82* (2013.01); *B64C 1/30* (2013.01); *B64C 2027/8281* (2013.01)

(58) Field of Classification Search
CPC ......... B64C 17/02; B64C 27/26; B64C 27/28; B64C 27/82
See application file for complete search history.

(56) References Cited

U.S. PATENT DOCUMENTS

| | | | | |
|---|---|---|---|---|
| 5,395,073 A | * | 3/1995 | Rutan ..................... | B64C 3/385 244/48 |
| 5,758,844 A | * | 6/1998 | Cummings ......... | B64C 29/0033 244/12.4 |

(Continued)

OTHER PUBLICATIONS

Leishman, J. Gordon, et al., "Conceptual Design Studies of a Mono Tiltrotor (MTR) Architecture," Final Report under Contract: Mono Tiltrotor (MTR) Studies, Contract No. N00014-03-C-0531, Office of Naval Research, Dec. 10, 2004, 107 pages, publisher Department of Aerospace Engineering, et al., University of Maryland, College Park, MD 20742.

*Primary Examiner* — Philip J Bonzell
*Assistant Examiner* — Tye William Abell
(74) *Attorney, Agent, or Firm* — Fogarty LLP

(57) ABSTRACT

Embodiments are directed to a rotorcraft comprising a body having a longitudinal axis, a wing coupled to the body, a single tiltrotor assembly pivotally coupled to the body, and the tiltrotor assembly configured to move between a position generally perpendicular to the longitudinal axis during a vertical flight mode and a position generally parallel to the longitudinal axis during a horizontal flight mode. The rotorcraft may further comprise an anti-torque system configured to counteract torque generated by the tiltrotor assembly during vertical flight. The rotorcraft may further comprise a center of gravity compensation system configured to manage a rotorcraft center of gravity during movement of the tiltrotor assembly between the vertical flight mode and the horizontal flight mode.

20 Claims, 28 Drawing Sheets

(51) Int. Cl.
*B64C 27/82* (2006.01)
*B64C 1/30* (2006.01)

(56) References Cited

U.S. PATENT DOCUMENTS

| | | | | |
|---|---|---|---|---|
| 5,863,013 | A * | 1/1999 | Schmittle | B64C 29/0033 244/48 |
| 6,343,768 | B1 | 2/2002 | Muldoon | |
| 6,382,556 | B1 * | 5/2002 | Pham | B64C 27/28 244/6 |
| 6,783,096 | B2 | 8/2004 | Baldwin | |
| 6,845,939 | B1 | 1/2005 | Baldwin | |
| 6,863,241 | B2 * | 3/2005 | Sash | B64C 27/52 244/17.25 |
| 6,974,105 | B2 * | 12/2005 | Pham | B64C 27/26 244/12.4 |
| 7,143,973 | B2 * | 12/2006 | Ballew | B64C 27/10 244/6 |
| 7,753,309 | B2 * | 7/2010 | Garreau | B64C 29/0033 244/12.4 |
| 8,256,704 | B2 | 9/2012 | Lundgren | |
| 8,857,755 | B2 * | 10/2014 | Karim | B64C 29/0008 244/12.4 |
| 8,936,212 | B1 * | 1/2015 | Fu | B64C 37/02 244/6 |
| 2005/0127238 | A1 * | 6/2005 | Ballew | B64C 27/10 244/10 |
| 2007/0114325 | A1 * | 5/2007 | Baldwin | B64C 29/02 244/17.11 |

* cited by examiner

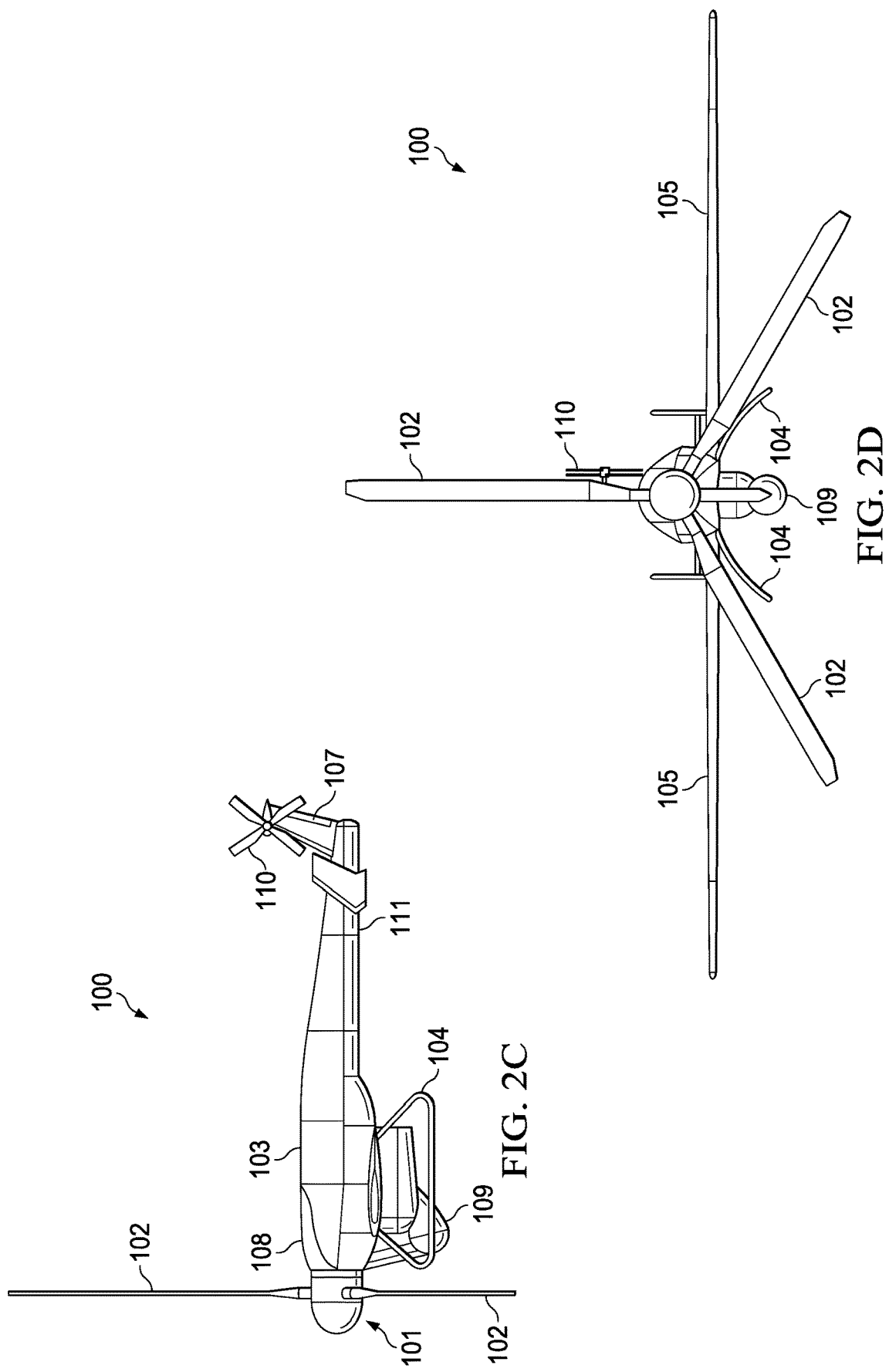

CENTERLINE TILTROTOR

TECHNICAL FIELD

The present invention relates generally to tiltrotor aircraft and, more specifically, to aircraft having a single tiltrotor mounted along the centerline of the aircraft.

BACKGROUND

Fixed-wing aircraft, such as airplanes, are capable of flight using wings that generate lift in response to the forward airspeed of the aircraft, which is generated by thrust from one or more jet engines or propellers. The wings generally have an airfoil cross section that causes higher pressure on the bottom and lower pressure on the top, thereby generating the lift force to support the aircraft in flight. Fixed-wing aircraft, however, typically require a runway that is hundreds or thousands of feet long for takeoff and landing.

Vertical takeoff and landing (VTOL) aircraft do not require runways for takeoff. Instead, VTOL aircraft are capable of taking off, hovering and landing vertically. One example of a VTOL aircraft is a helicopter, which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Helicopters, however, typically lack the forward airspeed of fixed-wing aircraft due to the phenomena of retreating blade stall and advancing blade compression.

Tiltrotor aircraft attempt to overcome this drawback by utilizing proprotors that can change their plane of rotation based on the operation being performed. Generally, tiltrotor aircraft typically have a pair of nacelles mounted near the outboard ends of a fixed wing with each nacelle housing a propulsion system that provides torque and rotational energy to a proprotor. The nacelles are rotatable relative to the fixed wing such that the proprotors have a generally horizontal plane of rotation providing vertical thrust for takeoff, hovering, and landing, much like a conventional helicopter, and a generally vertical plane of rotation providing forward thrust for cruising during forward flight with the fixed wing providing lift, much like a conventional propeller driven airplane.

SUMMARY

Tiltrotor aircraft currently in use have two rotor systems located on the end of a fixed wing. The size of the rotor systems is limited by the distance between them such that the rotor blade length must be limited to avoid the rotor blades on the opposite rotor system, and clearance with the fuselage upon converting to forward flight. However, it is known that a larger rotor disk area generally means better hover efficiency (i.e., the weight of the aircraft versus the power required to keep it aloft). Accordingly, a need has arisen for improved systems and methods for a single tiltrotor aircraft having a large, efficient rotor system with rotor blades that are not limited by the presence of a second rotor system.

Embodiments are directed to a rotorcraft comprising a body having a longitudinal axis, a wing coupled to the body, a single tiltrotor assembly pivotally coupled to the body, and the tiltrotor assembly configured to move between a position generally perpendicular to the longitudinal axis during a vertical flight mode and a position generally parallel to the longitudinal axis during a horizontal flight mode.

The rotorcraft may further comprise an anti-torque system configured to counteract torque generated by the tiltrotor assembly during vertical flight. The anti-torque system generates a variable anti-torque force that is at a maximum during the vertical flight mode and at a minimum during the horizontal flight mode. The anti-torque system comprises one or more of an open tail rotor, a protected tail rotor, an electric distributed anti-torque system, a propulsive anti-torque system, and a wingtip anti-torque system.

The rotorcraft may further comprise a center of gravity compensation system configured to manage a rotorcraft center of gravity during movement of the tiltrotor assembly between the vertical flight mode and the horizontal flight mode. The center of gravity compensation system may be a counterweight configured to counterbalance movement of the tiltrotor assembly. The counterweight may comprise at least a portion of a propulsion system or mission equipment.

The tiltrotor assembly may comprise a proprotor, and a propulsion system. In some embodiments, the proprotor may move between a vertical flight mode position and a horizontal flight mode position while the propulsion system is fixedly mounted in the body. In other embodiments, the proprotor and the propulsion system may move together between a vertical flight mode position and a horizontal flight mode position.

BRIEF DESCRIPTION OF THE DRAWINGS

Having thus described the invention in general terms, reference will now be made to the accompanying drawings, which are not necessarily drawn to scale, and wherein:

FIGS. 1A-D illustrate perspective, top, side, and front views, respectively, of a tiltrotor aircraft in a helicopter mode.

FIGS. 2A-D illustrate perspective, top, side, and front views, respectively, of a tiltrotor aircraft in an aircraft mode.

FIGS. 3A-D illustrate perspective, top, side, and front views, respectively, of another embodiment of a tiltrotor aircraft in a helicopter mode.

FIGS. 4A-D illustrate perspective, top, side, and front views, respectively, of another embodiment of a tiltrotor aircraft in an aircraft mode.

Figure 5A:
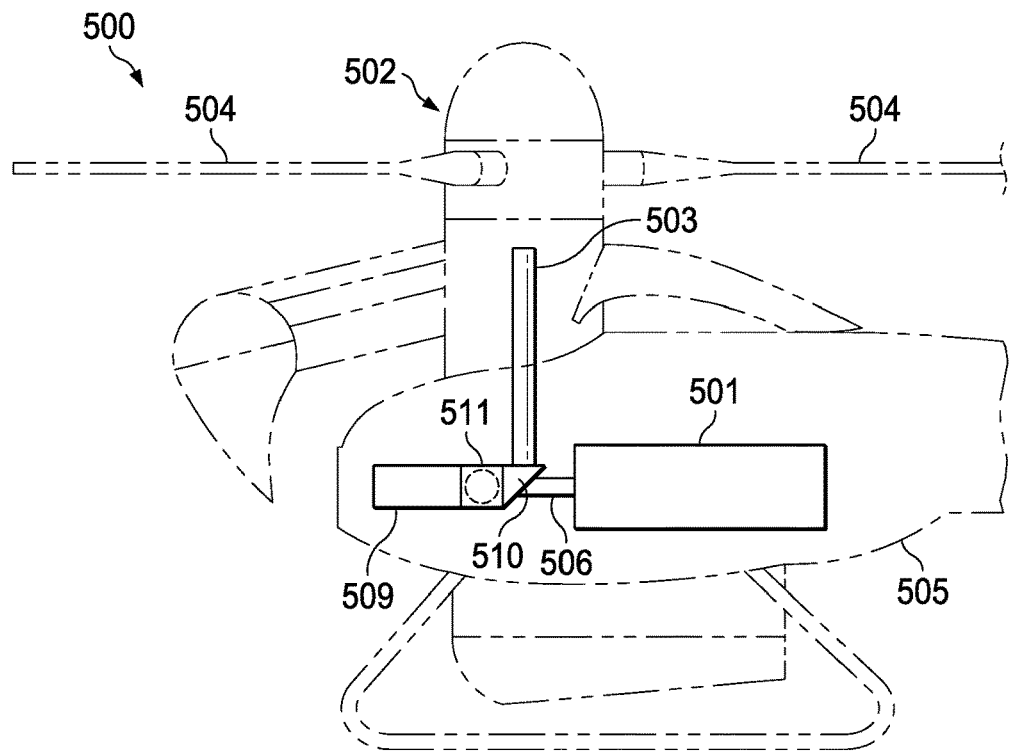
Figure 5B:
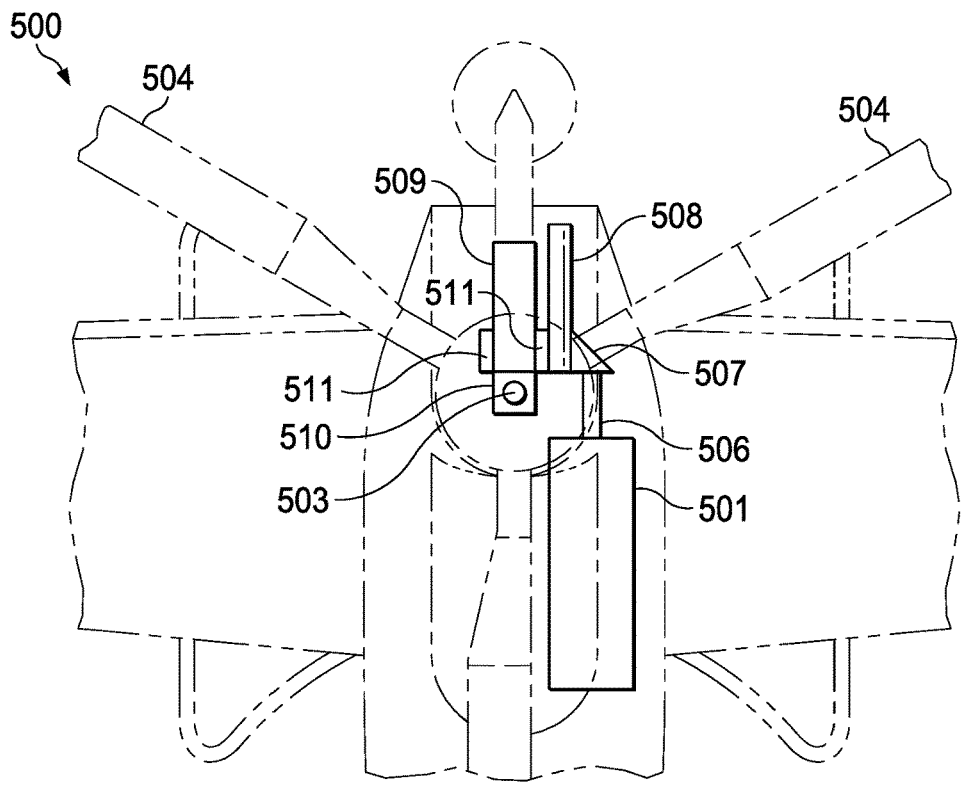

FIGS. 5A and 5B are side and top views, respectively, of a propulsion system in a tiltrotor aircraft configured in a helicopter mode.

Figure 6A:
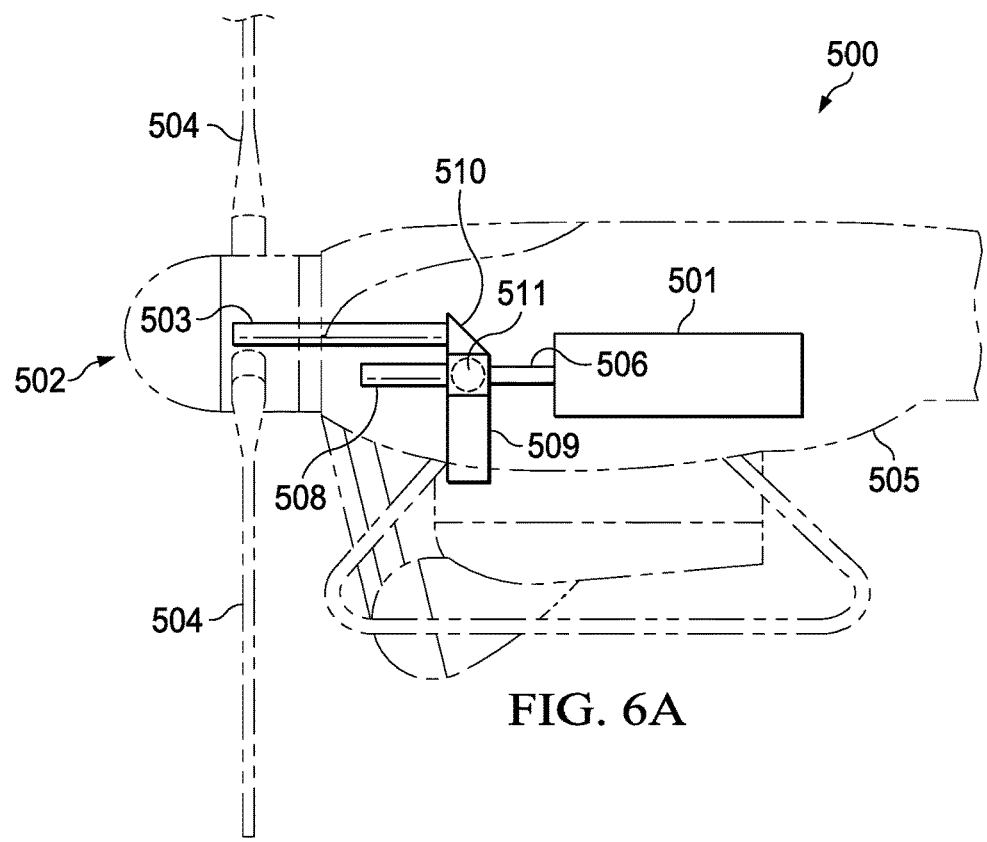
Figure 6B:
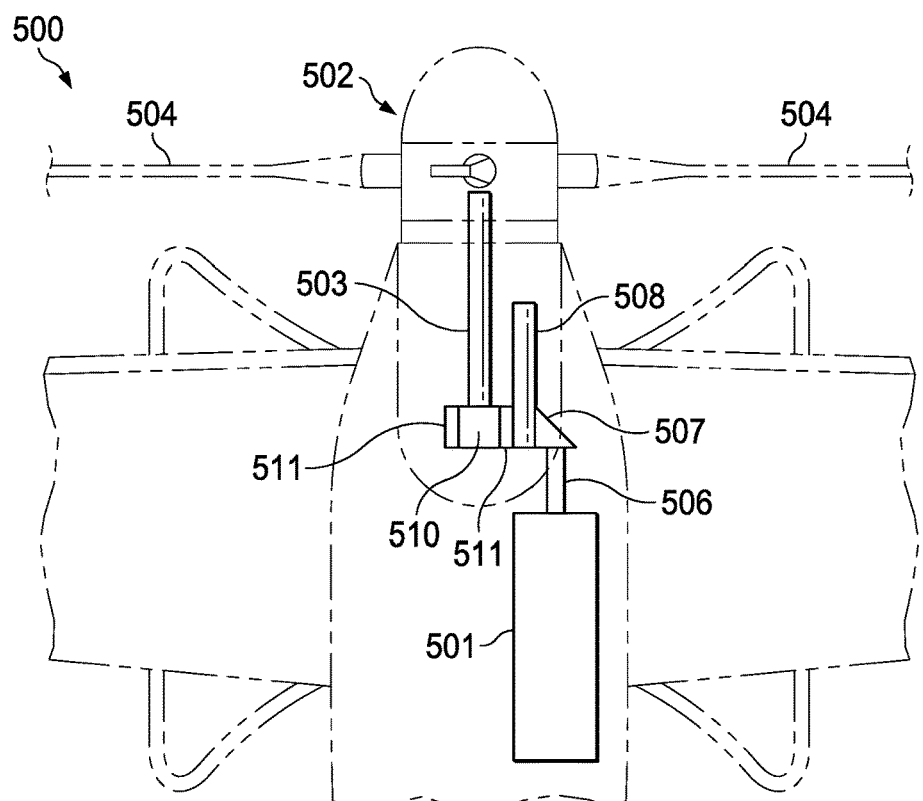

FIGS. 6A and 6B are side and top views, respectively, of the propulsion system in the tiltrotor aircraft configured in an aircraft mode.

FIGS. 7A-G illustrate variations in the structure of a single, centerline tiltrotor aircraft according to different embodiments.

FIGS. 8A-D depict various landing gear options available for a single, centerline tiltrotor aircraft.

FIGS. 9A-E depict various wing fold and stow configurations for a single, centerline tiltrotor aircraft.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1A:
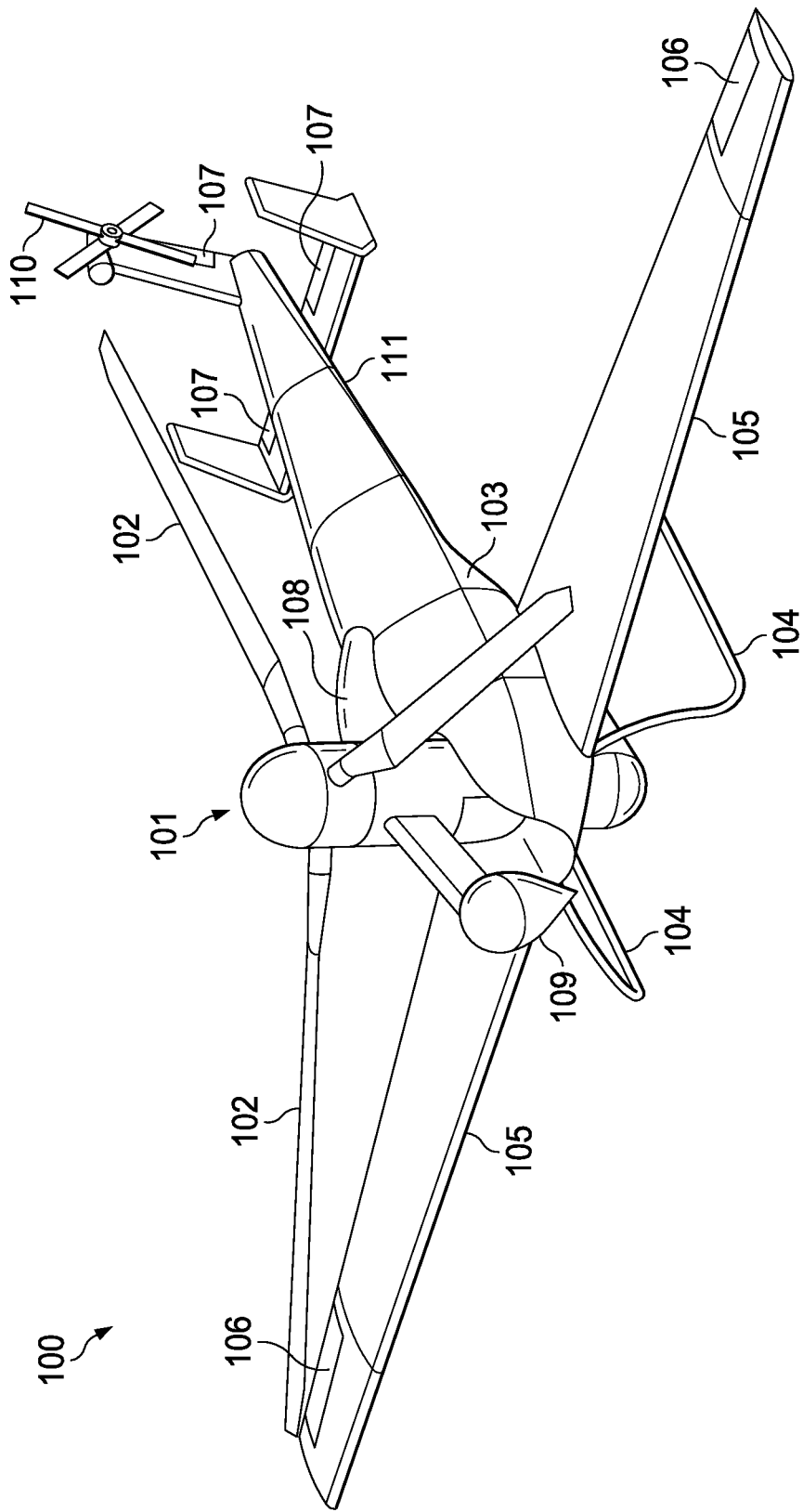
Figure 1B:
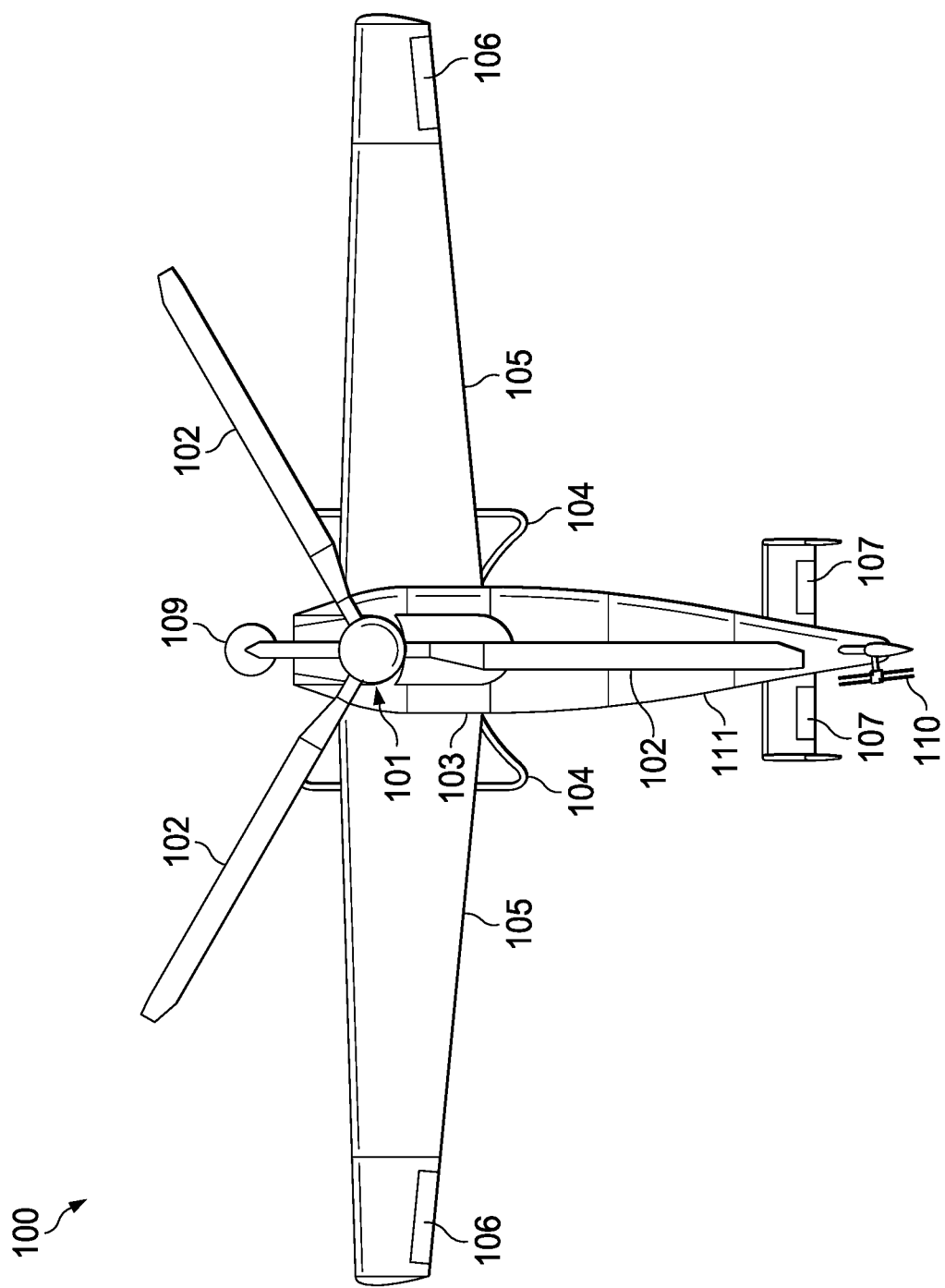
Figure 1C:
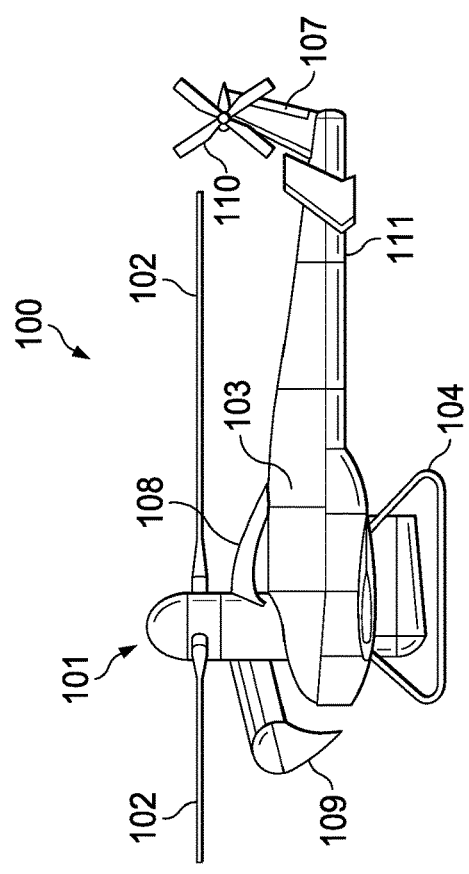
Figure 1D:
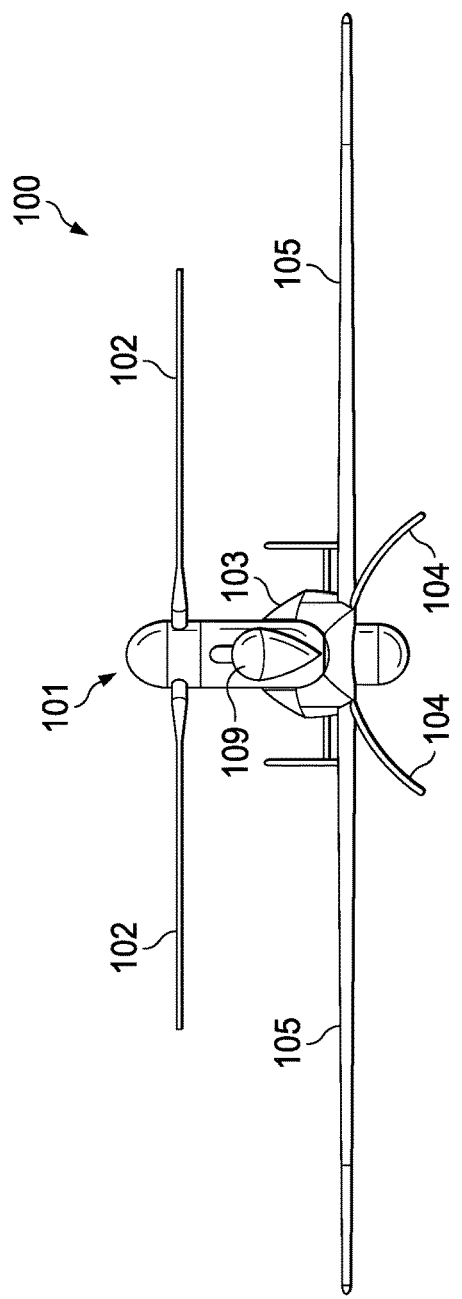

FIGS. 1A-D and 2A-D illustrate an aircraft 100 with a single, centerline tiltrotor according to an example embodiment. FIG. 1A is a perspective view of tiltrotor aircraft 100 in a helicopter mode wherein proprotor 101 is in a substantially vertical position so that rotor blades 102 provide a lifting thrust. FIGS. 1B-D are top, side, and front views, respectively, of aircraft 100 configured in helicopter mode.

Figure 2A:
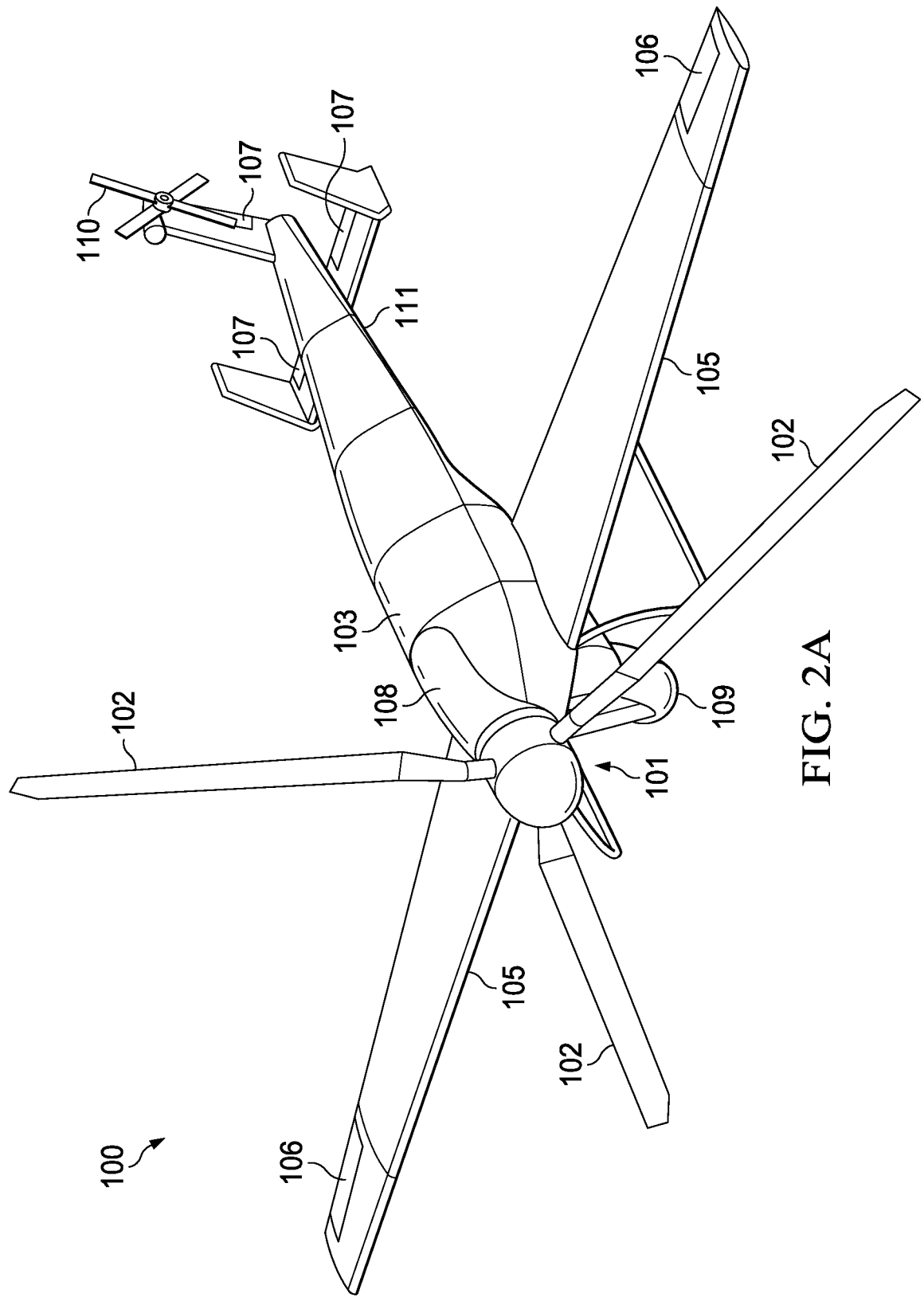
Figure 2B:
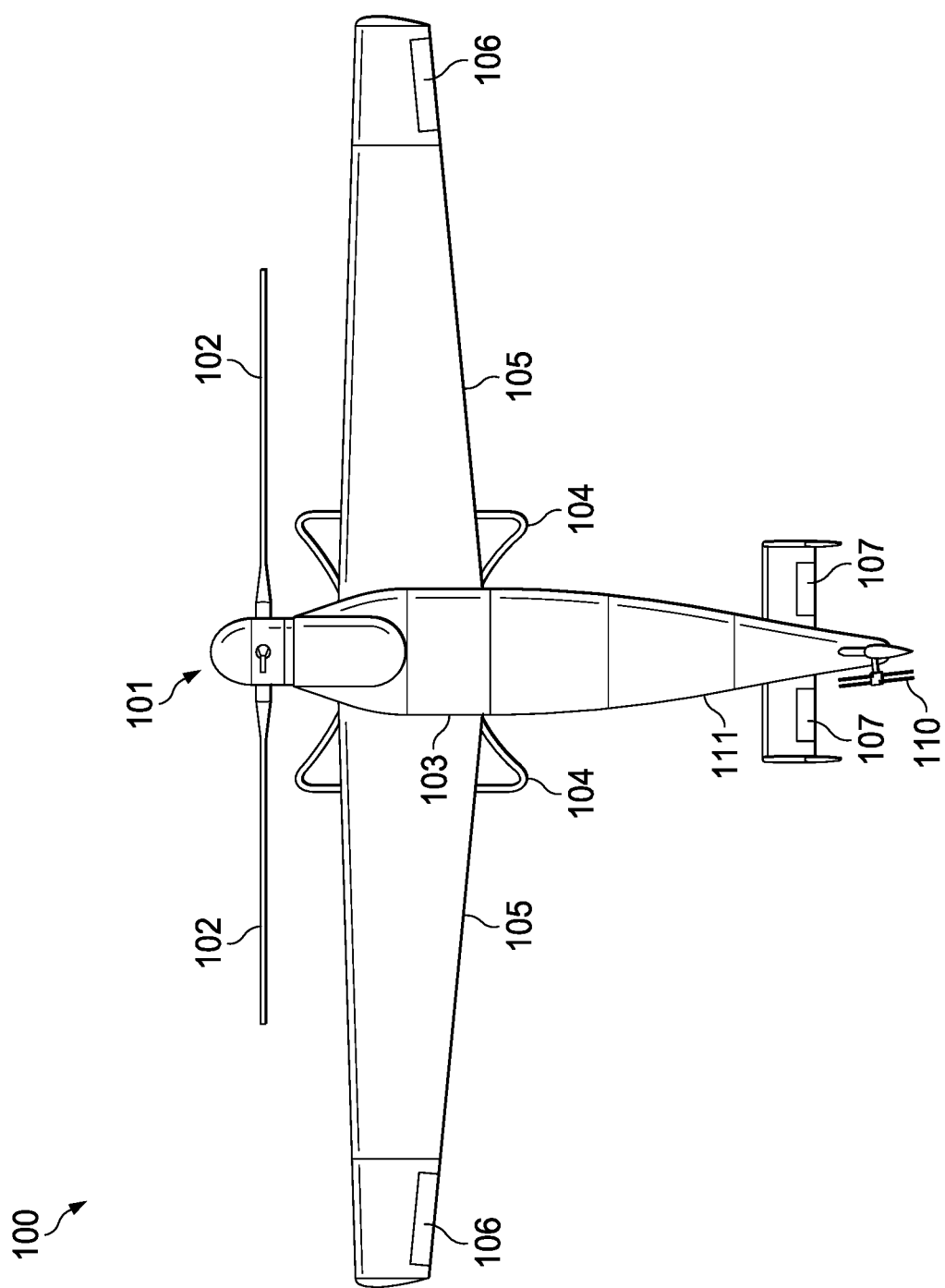

FIG. 2A is a perspective view of tiltrotor aircraft 100 in an airplane mode wherein proprotor 101 is in a substantially horizontal position so that rotor blades 102 provide thrust for forward movement. FIGS. 2B-D are top, side, and front views, respectively, of aircraft 100 configured in aircraft mode.

Tiltrotor aircraft 100 may include a fuselage 103, landing gear 104, and wings 105. A propulsion system (not shown) may be located within fuselage 103 and may comprise a turbine engine or other power plant. During operation, the propulsion system drives proprotor 101 and rotor blades 102. In one embodiment, the propulsion system maintains a constant rotational speed for proprotor 101, and the pitch of rotor blades 102 is adjusted to selectively control thrust and lift forces applied to tiltrotor aircraft 100. Tiltrotor aircraft 100 may be manned or unmanned. In a manned embodiment, tiltrotor aircraft 100 includes controls, e.g., cyclic controllers and pedals, that are carried within a cockpit of fuselage 103 for causing movement of the aircraft 100 and for selectively controlling the pitch of each rotor blade 102 to control the direction, thrust, and lift of tiltrotor aircraft 100. For example, during flight a pilot may manipulate a cyclic controller to change the pitch angle of rotor blades 102 and/or manipulate pedals to provide vertical, horizontal, and yaw flight movement. In an unmanned embodiment, such flight control inputs are provided by an autopilot or a remotely controlled flight computer.

Proprotor 101 is mechanically coupled to an actuator system (not shown) that is used to move the proprotor 101 between the airplane mode and the helicopter mode. When operating in airplane mode, vertical lift is primarily supplied by the airfoil profile of wings 105, while rotor blades 102 provide forward thrust. When operating in helicopter mode, vertical lift is primarily supplied by the thrust of rotor blades 102. It should be appreciated that tilt rotor aircraft 100 may be operated such that proprotor 101 may be selectively positioned at various angles between airplane mode and helicopter mode, which can be referred to as a conversion mode. Control surfaces 106 on wing 105 may be used to adjust the attitude of tiltrotor aircraft 100 around the pitch, roll, and yaw axes while in airplane or conversion mode. Additional stabilizers or control surfaces 107 may be required when tiltrotor aircraft 100 is in airplane or conversion mode. Control surfaces 106 and 107 may be, for example, ailerons, flaps, slats, spoilers, elevators, rudders, or ruddervators.

One or more moveable fairings 108 may be attached to the proprotor nacelle and adapted to provide an aerodynamic surface while proprotor 100 is in the airplane, conversion, and/or helicopter position. A counterweight 109 is mechanically coupled to proprotor 101 and moves with proprotor 101 as it is rotated between the vertical and horizontal positions. The size, weight, and positioning of counterweight 109 may be selected to counterbalance the weight of proprotor 101 in order to control and/or manage the center of gravity for aircraft 100 during transitions between different flight modes. Counterweight 109 may comprise a deadweight or may include useful components, such as engine and/or gearbox components or mission equipment.

While operating in helicopter mode as illustrated in FIGS. 1A-D, tiltrotor aircraft 100 requires an anti-torque force to counteract torque generated by the rotation of proprotor 101. When rotor blades 102 are turning, there is an equal-and-opposite reaction that tries to turn fuselage 103 in the opposite direction. In one embodiment, a tail rotor 110 may be used as to create an anti-torque force. The position and distance of tail rotor 110 from aircraft 100's center of gravity allow tail rotor 110 to develop thrust in the same direction as the rotation of rotor blades 102, which counters the torque effect created by proprotor 101. The pitch of the blades on tail rotor 110 may be adjustable, such as by a pilot via anti-torque pedals or by a flight control computer, which allows for control of the anti-torque force magnitude. This provides directional control by allowing the pilot or flight control computer to rotate aircraft 100 around the vertical axis.

As proprotor 101 transitions from helicopter mode to aircraft mode, the torque generated will decrease and, therefore, the anti-torque forces created by tail rotor 111 may also be decreased. As aircraft 100 enters into aircraft mode, other forces, such as propeller torque and P-factor, increase and may be countered by flight control surfaces, such as ailerons and rudders. Similarly, a transition from aircraft mode to helicopter mode will require a decrease in propeller torque and P-factor forces and an increase in torque forces, which will necessitate a decrease in flight control inputs accompanied by an increase in anti-torque force from tail rotor 111 to maintain balanced flight.

The single tiltrotor aircraft 100 may be optimized for maximum takeoff gross weight, range, and/or endurance. Because there is only a single tiltrotor, the main rotor may have a large diameter since there is no need to deconflict between two or more rotors and fuselage. Additionally, the wings 105 may be long and thin with a high aspect ratio to provide higher lift forces and to enable sustained, endurance flight. The high aspect ratio creates less induced drag and, therefore, requires less fuel consumption.

Tiltrotor aircraft 100 has a tailboom-type empennage 111 that allows for various flight control, stabilization, and anti-torque configurations. When not in use, wings 105 and/or empennage 111 may be folded or otherwise stowed so that aircraft 100 can be stored or parked in an area requiring minimal space. Aircraft 100 may also include hardpoints or pylons on wings 105 to carry external loads, such as ordnance, weapons, sensors, countermeasures, drop tanks, cameras, or searchlight systems.

Figure 3A:
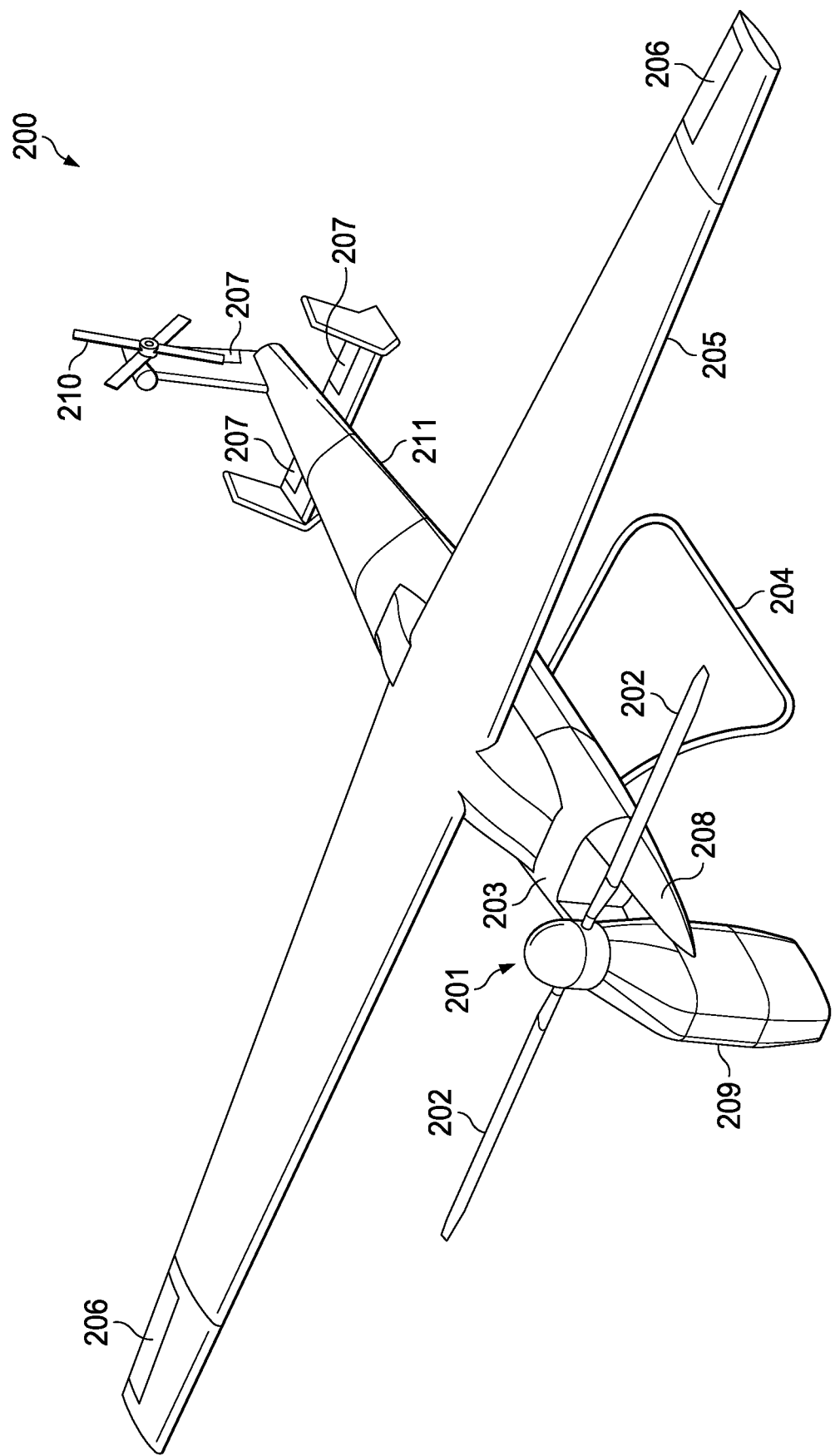
Figure 3B:
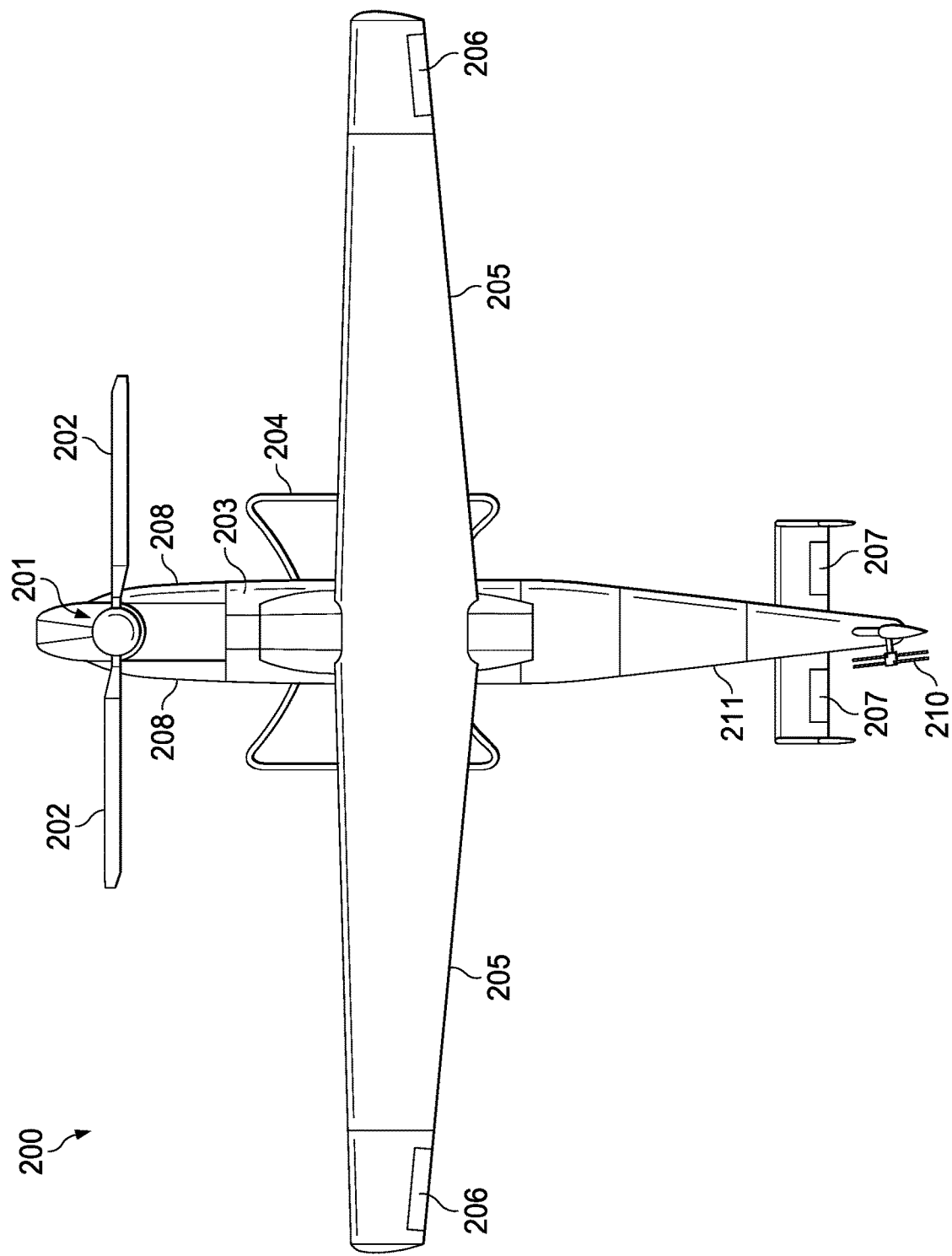
Figure 3C:
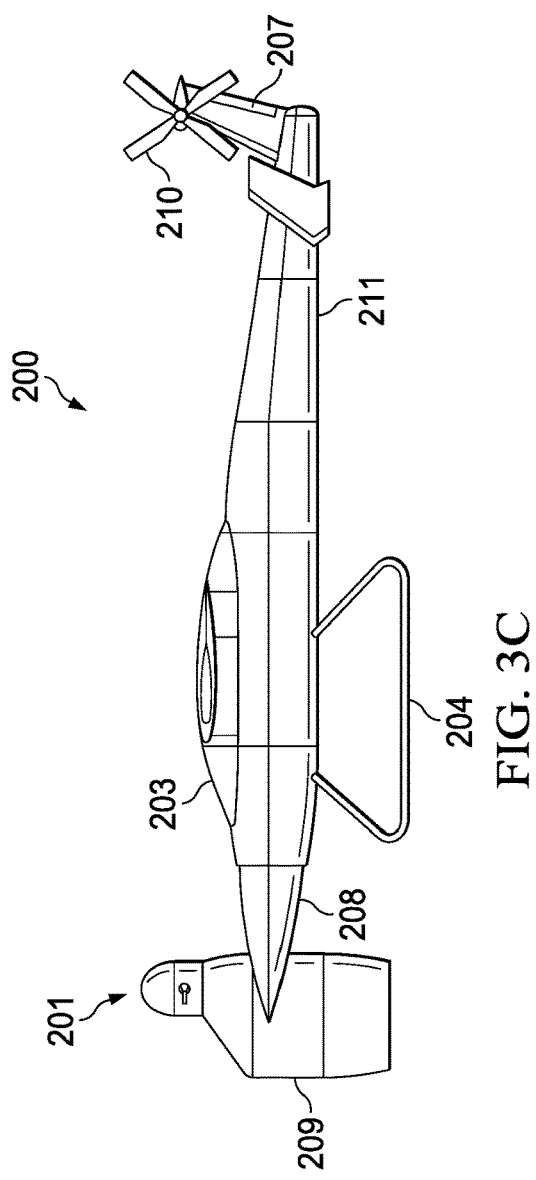
Figure 3D:
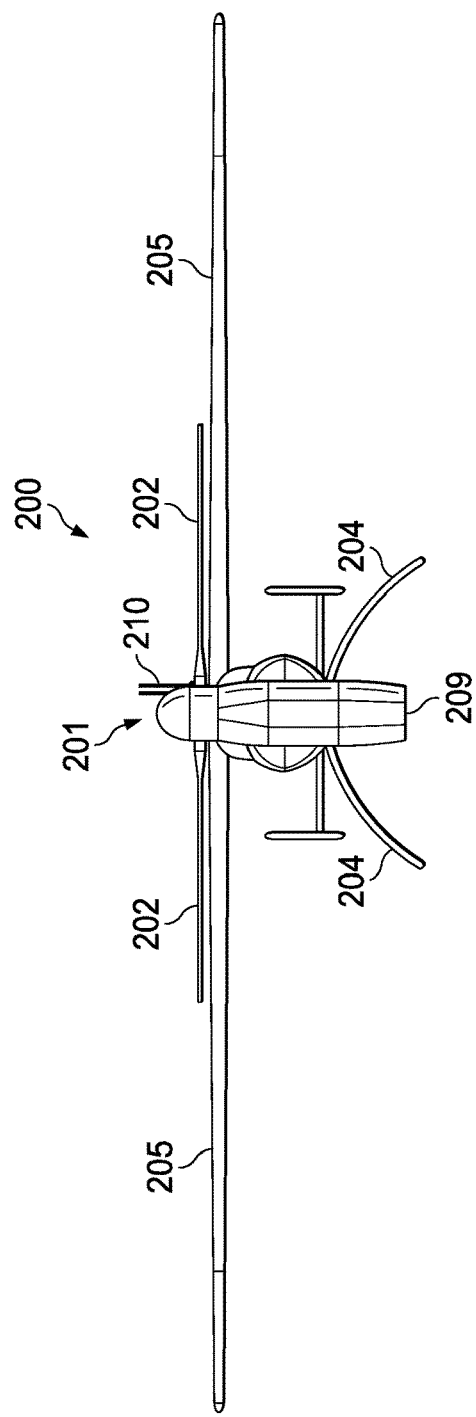
Figure 4A:
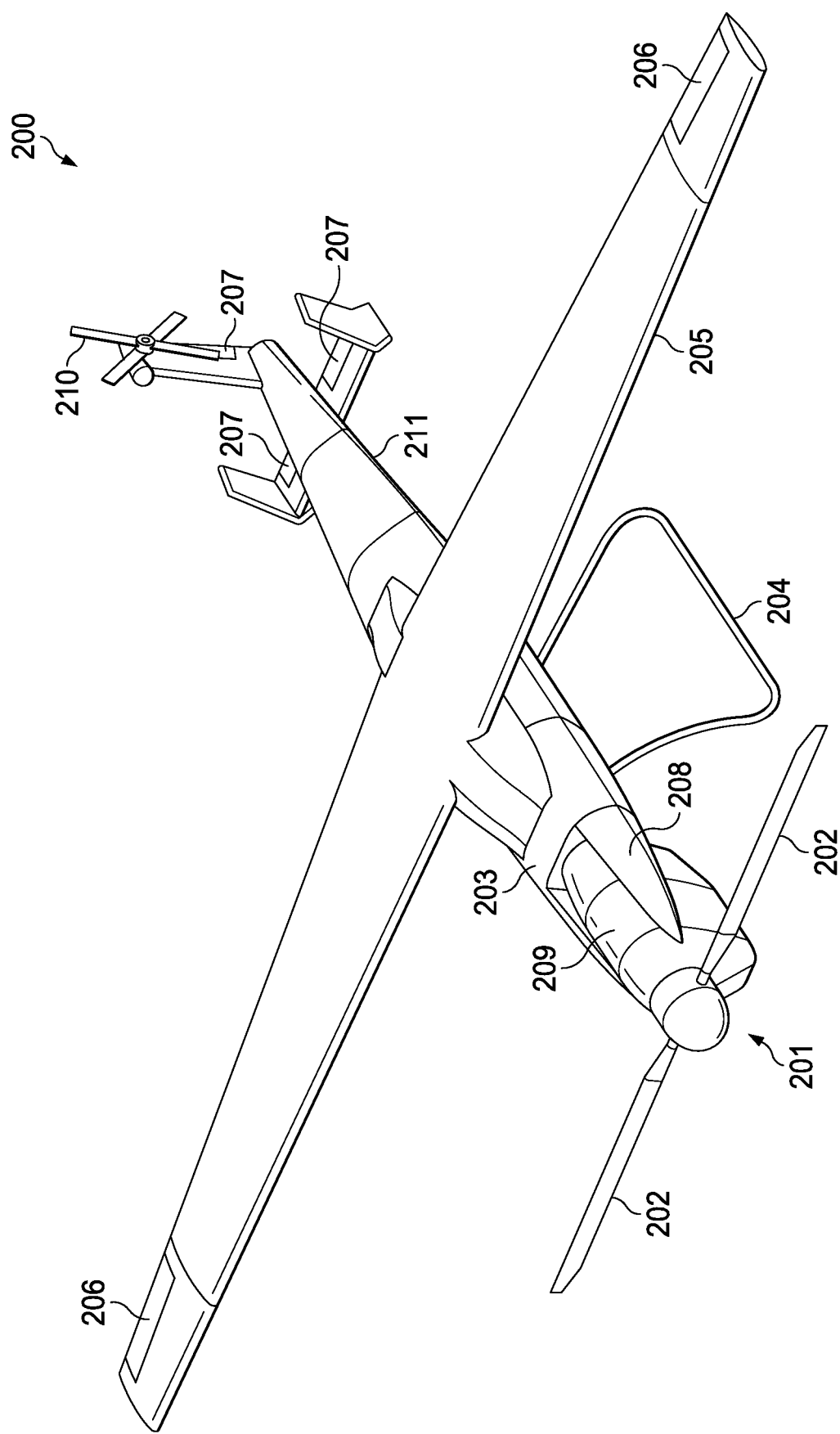
Figure 4B:
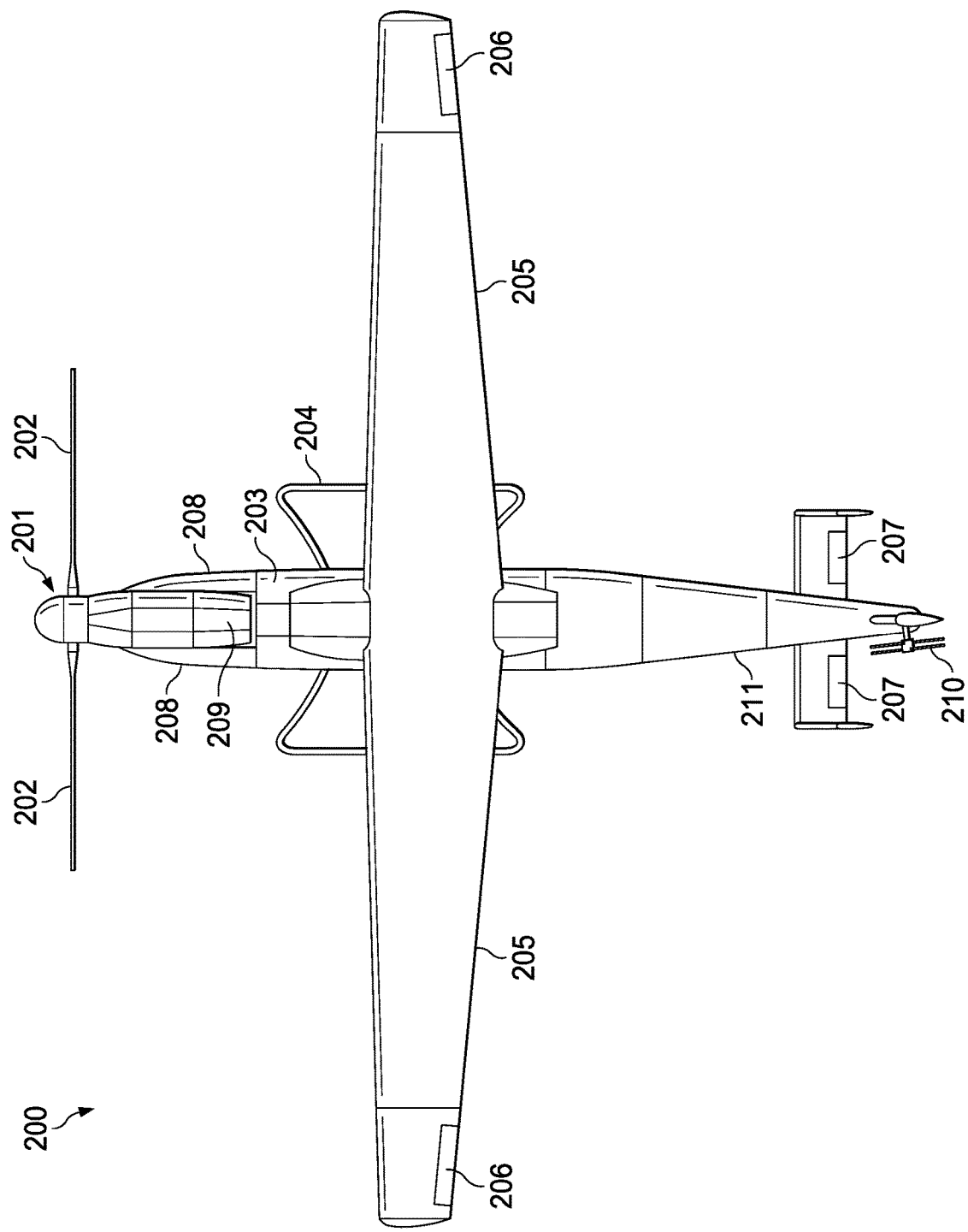
Figure 4C:
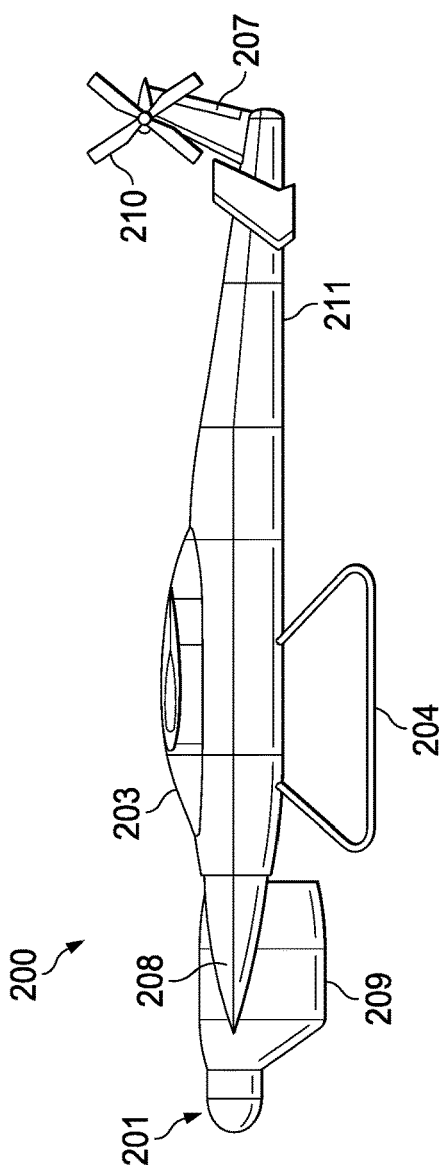
Figure 4D:
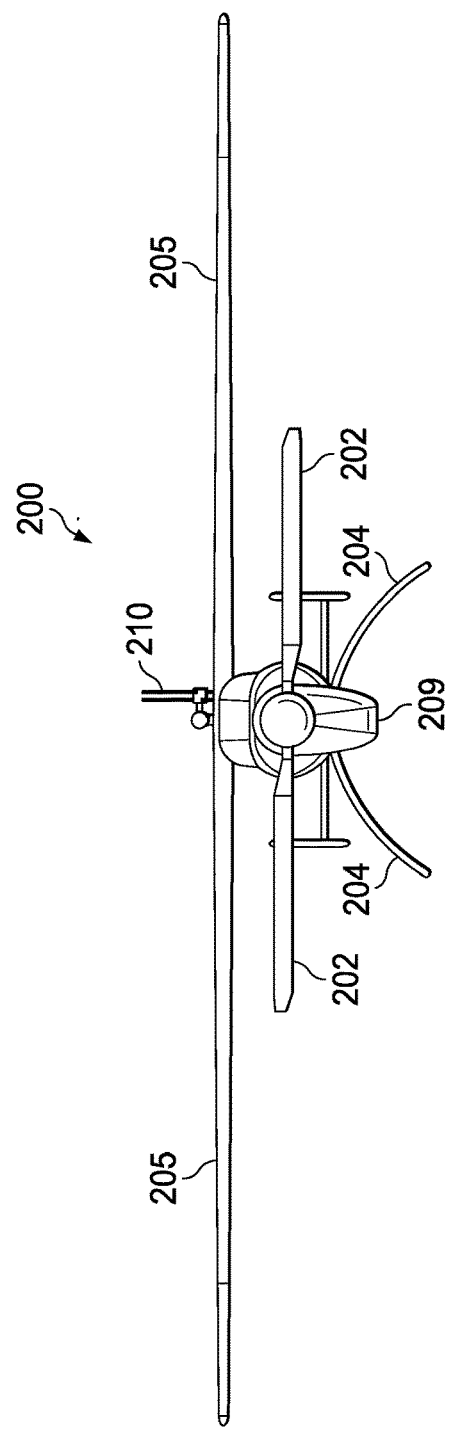

FIGS. 3A-D and 4A-D illustrate aircraft 200, which has a single, centerline tiltrotor according to another example embodiment. FIG. 3A is a perspective view of tiltrotor aircraft 200 in a helicopter mode wherein proprotor 201 is in a substantially vertical position so that rotor blades 202 provide a lifting thrust. FIGS. 3B-D are top, side, and front views, respectively, of aircraft 200 configured in helicopter mode. FIG. 4A is a perspective view of tiltrotor aircraft 100 in an airplane mode wherein proprotor 201 is in a substantially horizontal position so that rotor blades 202 provide thrust for forward movement. FIGS. 4B-D are top, side, and front views, respectively, of aircraft 200 configured in aircraft mode.

Tiltrotor aircraft 200 may include a fuselage 203, landing gear 204, wings 205, and tailboom empennage 211. When operating in airplane mode, vertical lift is primarily supplied by the airfoil profile of wings 205, while rotor blades 202 provide forward thrust. When operating in helicopter mode, vertical lift is primarily supplied by the thrust of rotor blades 202. It should be appreciated that tilt rotor aircraft 200 may be operated such that proprotor 201 may be selectively positioned at various angles between airplane mode and helicopter mode, which can be referred to as a conversion mode.

Control surfaces 206 on wing 205 may be used to adjust the attitude of tiltrotor aircraft 200 around the pitch, roll, and yaw axes while in airplane or conversion mode. Additional stabilizers or control surfaces 207 may be required when tiltrotor aircraft 200 is in airplane or conversion mode. Control surfaces 206 and 207 may be, for example, ailerons, flaps, slats, spoilers, elevators, rudders, or ruddervators. Tiltrotor aircraft 200 may be manned or unmanned and may be controlled during flight by a pilot or by an autopilot or a remotely controlled flight computer. In one embodiment, a tail rotor 210 may be used as to create an anti-torque force that generates thrust in the same direction as the rotation of rotor blades 202, which counters the torque effect created by proprotor 201 in helicopter mode.

Proprotor 201 is supported by struts 208. An actuator system (not shown) is used to move proprotor 201 between the airplane mode and the helicopter mode. Proprotor 201 is attached to a counterweight 209 that moves with proprotor 201 as it is rotated between the vertical and horizontal positions. The size, weight, and positioning of counterweight 209 may be selected to counterbalance the weight of proprotor 201 in order to control and/or manage the center of gravity for aircraft 200 during transitions between different flight modes. Counterweight 209 may comprise a deadweight or may include useful components, such as engine and/or gearbox components or mission equipment.

In one embodiment, a propulsion system (not shown) may be located within fuselage 203 and may comprise a turbine engine or other power plant. During operation, the propulsion system drives proprotor 201 and rotor blades 202. In another embodiment, the propulsion system functions as counterweight 209 and moves as a single unit with proprotor 201 between horizontal and vertical positions. The propulsion system may maintain a constant rotational speed for proprotor 201, and the pitch of rotor blades 202 may be adjusted to selectively control thrust and lift forces applied to tiltrotor aircraft 200.

The embodiments illustrated in FIGS. 1A and 3A show tiltrotor aircraft with three and two rotor blades, respectively. It will be understood that any number of rotor blades may be used with a single, centerline tiltrotor aircraft. In other embodiments, any number (i.e., one or more) of rotor blades may be used on the single, centerline tiltrotor aircraft. The number and size of rotorblades may be selected based upon any appropriate parameters, such as rotor disk size, engine power, rotor blade angle of attack, rotor blade diameter, camber, and/or chord, rotor blade tip speed, and the like.

FIGS. 5A and 5B are side and top views, respectively, of a propulsion system in a tiltrotor aircraft 500 configured in a helicopter mode. FIGS. 6A and 6B are side and top views, respectively, of the propulsion system in tiltrotor aircraft 500 configured in an aircraft mode. The propulsion system generally includes a power train, mast, hub, swashplate, and pitch links. The mast and hub are mechanical components for transmitting torque and/or rotation from an engine 501, such as a gas turbine engine, to proprotor 502. The power train may include a variety of components, including a transmission and differentials. In operation, a mast 503 receives torque or rotational energy from engine 501 via the power train and rotates the proprotor 502 and rotor blades 504. A swashplate (not shown) translates flight control inputs into motion of blades 504. Rotor blades 504 are usually spinning when tiltrotor aircraft 500 is in flight, and the swashplate transmits flight control input from the non-rotating fuselage 505 to the hub, blades 504, and/or components coupling the hub to blades 504 (e.g., grips, pitch horns, etc.). Although engine 501 is depicted in FIGS. 5B and 6B as being offset from the aircraft centerline, it will be understood that in other embodiments the engine may be located in any appropriate position required to maintain proper aircraft weight and balance.

During operation, engine 501 generates torque on drive shaft 506, which drives a first spiral bevel gearbox 507 that includes helical bevel gears that convert rotation around one axis to rotation around a perpendicular axis. The torque from engine 501 is transferred from first spiral bevel gearbox 507 to accessory gearbox 508 and planetary gearbox 509. Accessory gearbox may have attachment points for engine accessories, such as a starter-generator, fuel pump, tachometers, etc.

Planetary gearbox 509 may be directly coupled to first spiral bevel gearbox 507 or indirectly coupled via accessory gearbox 508. Planetary gearbox 509 transfers high torque loads to mast 503 through a second spiral bevel gearbox 510. As proprotor 502 moves between vertical and horizontal positions when transitioning between helicopter and airplane modes, planetary gearbox 509 rotates on pillow block bearing 511.

As illustrated in the example drive train shown in FIGS. 5A-B and 6A-B, the engine 501, drive shaft 506, first spiral bevel gearbox 507, accessory gearbox 508, and pillow block 511 maintain their position during operation, while the mast 503, second spiral bevel gearbox 510, and planetary gearbox 509 change position during rotation of the proprotor 502. In some embodiments, planetary gearbox 509 may function as a counterweight. The movement of planetary gearbox 509 and its associated mass may be used to offset changes in the center of gravity for aircraft 500 caused my movement of proprotor 502. The positioning of planetary gearbox 509 and mast 503 relative to pillow block 511 may be selected to adjust how the center of gravity changes during rotation of the proprotor 502. For example, in the illustrated example, although planetary gearbox 509 rotates around the axis of pillow block 511, mast 503 rotates from a position above pillow block 511 (while in airplane mode) to a position behind pillow block 511 (while in helicopter mode), thereby allowing the center of gravity to shift farther aft in helicopter mode.

The example single, centerline tiltrotor aircraft propulsion system depicted in FIGS. 5A-B and 6A-B allows the engine 501 to maintain a fixed position in the fuselage 505 of aircraft 500. However, the drive train in this embodiment must be adapted to provide power with the proprotor in different positions. In other embodiments, such as illustrated in FIGS. 3A-D and 4A-D, the propulsion system for a single, centerline tiltrotor aircraft may move with the proprotor assembly. In a configuration having a moveable engine, the drive train would be simplified since it would not have to adapt to changes in the relative orientation of the engine and proprotor.

In other embodiments, planetary gearbox 509 may be located in other positions in the drivetrain, such as between mast 503 and second spiral bevel gearbox 510, which would allow the planetary to directly drive mast 503 and would generally maintain the weight of the planetary in line with the proprotor 502 instead of being offset as depicted in FIGS. 5A-D and 6A-D.

Figure 7A:
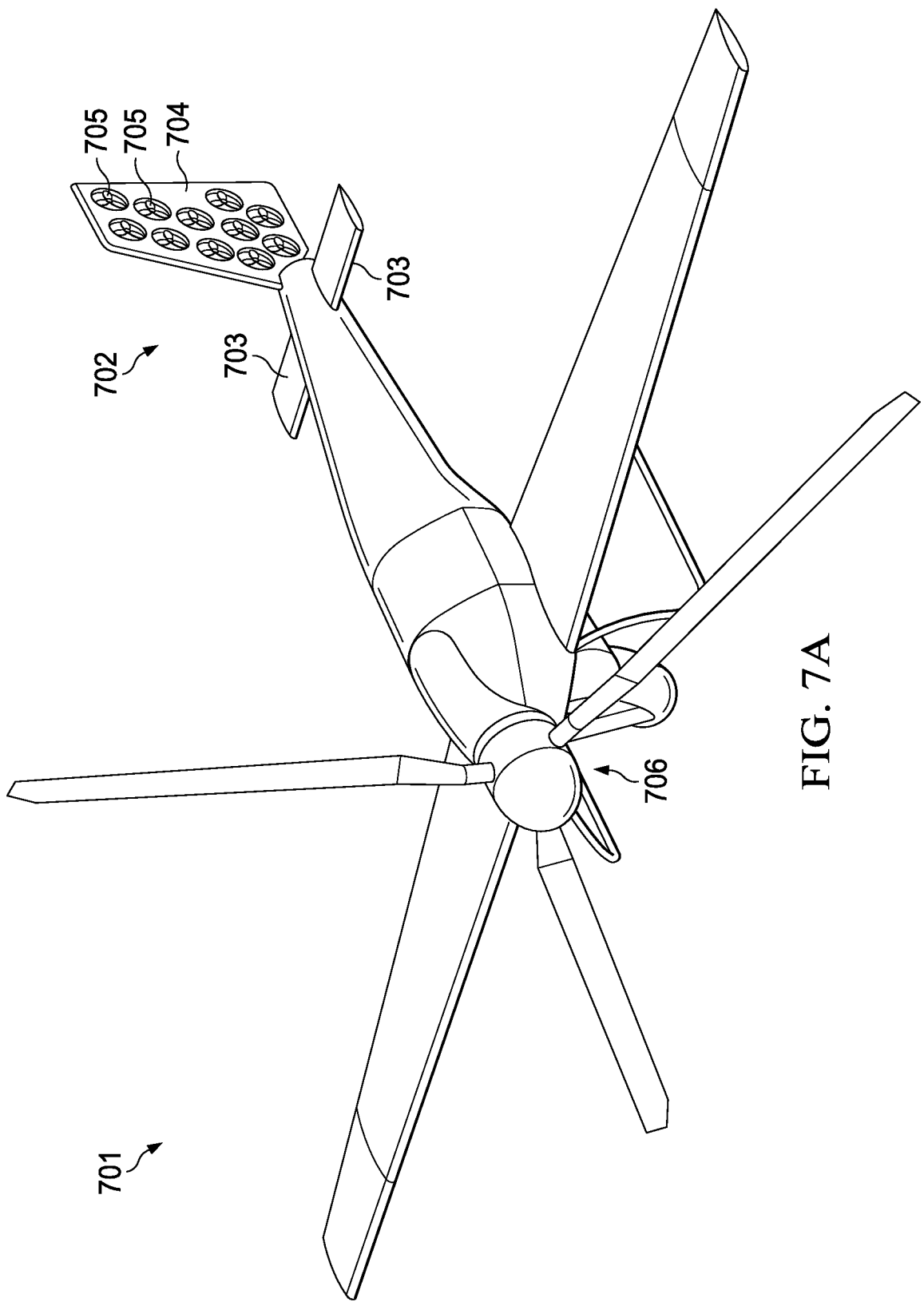

FIGS. 7A-G illustrate variations in the structure of a single, centerline tiltrotor aircraft according to different embodiments. FIG. 7A depicts a single, centerline tiltrotor aircraft 701 having a T-tail configuration 702 comprising elevators 703, which may be used to control aircraft pitch motion in airplane mode. Aircraft 701 has a rudder section 704 that may be used to control yaw motion in airplane mode. Rudder section 704 further comprises an electric distributed anti-torque (EDAT) system in which two or more electrically driven fans 705 generate thrust that opposes the torque generated by proprotor 706 when operating in helicopter mode.

Figure 7B:
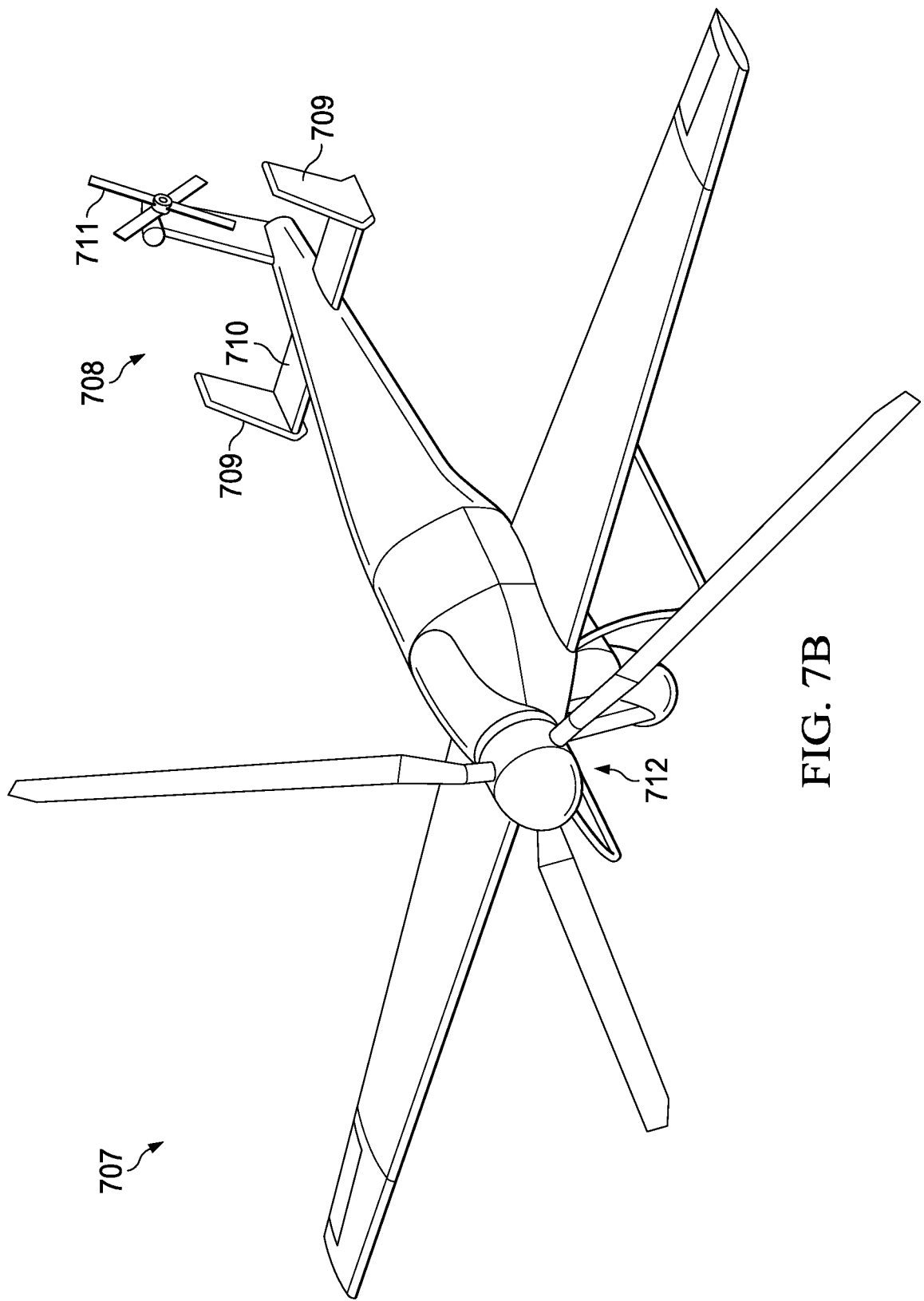

FIG. 7B depicts a single, centerline tiltrotor aircraft 707 having an H-tail (or twin tail) configuration 708. Two vertical stabilizers 709 are mounted at the outside of a horizontal stabilizer 710. When operating in airplane mode, vertical stabilizers 708 may be used to control aircraft yaw motion and horizontal stabilizer 710 may be used to control pitch motion. Aircraft 707 also comprises a tail rotor 711 that opposes the torque generated by proprotor 712 when operating in helicopter mode.

Figure 7C:
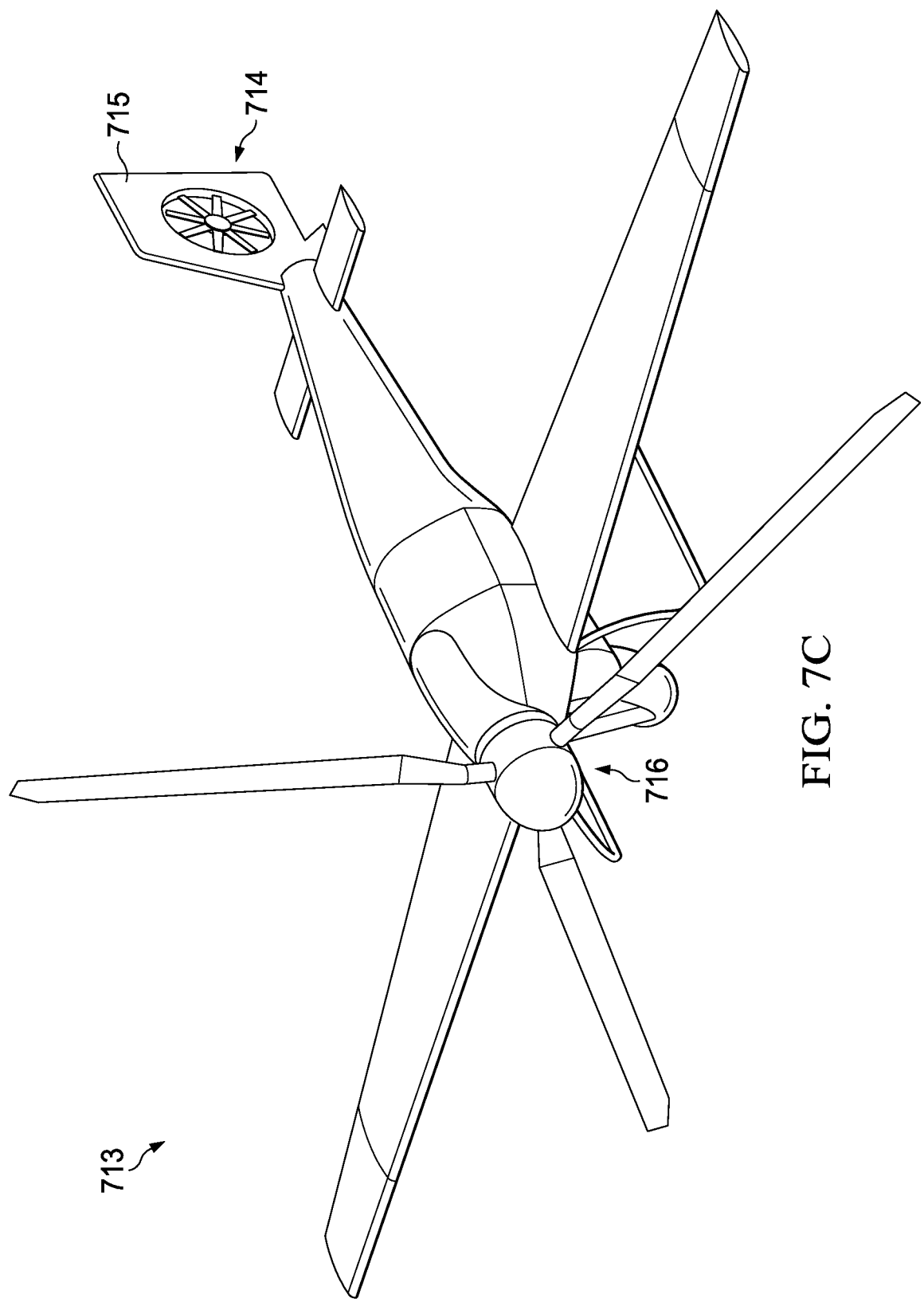

FIG. 7C depicts a single, centerline tiltrotor aircraft 713 having a protected tail rotor or FENESTRON™ 714, which comprises a plurality of blades spinning inside a circular housing at the base of aircraft 713's tail fin 715. Protected tail rotor 714 and proprotor 716 may be powered by the same engine in aircraft 713. The protected tail rotor 714 is an anti-torque device that opposes the torque generated by proprotor 716 when operating in helicopter mode.

Figure 7D:
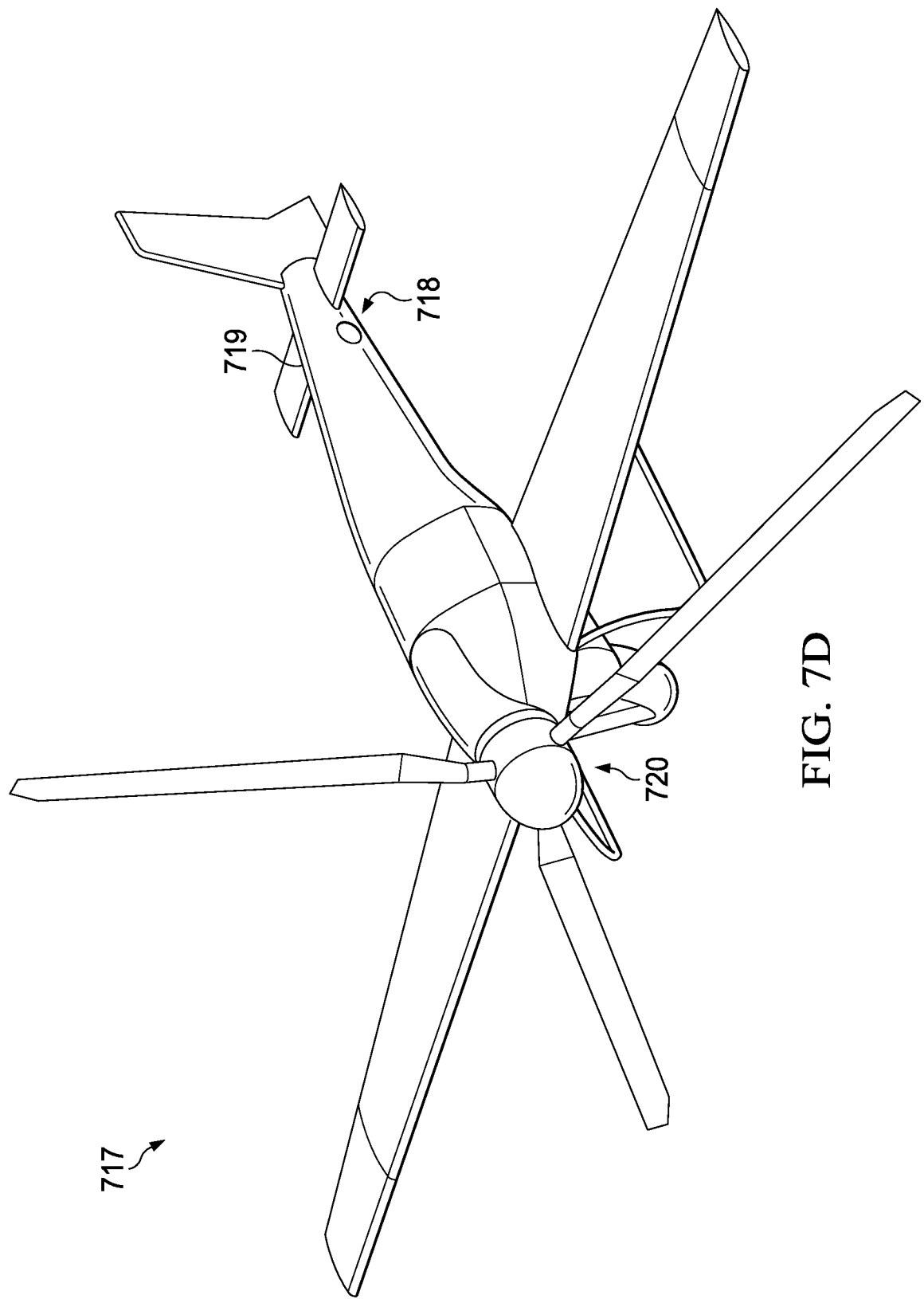

FIG. 7D depicts a single, centerline tiltrotor aircraft 717 having a propulsive anti-torque system (PATS) 718. PATS 718 is a no-tail-rotor system that uses air flowing through tailboom 719 and directionally nozzled to help counter torque generated by proprotor 720 when operating in helicopter mode. The airflow in PATS 718 may be, for example, how engine exhaust gases mixed with cold ambient airflow. PATS 718 eliminates the need for a tail rotor and the associated weight.

Figure 7E:
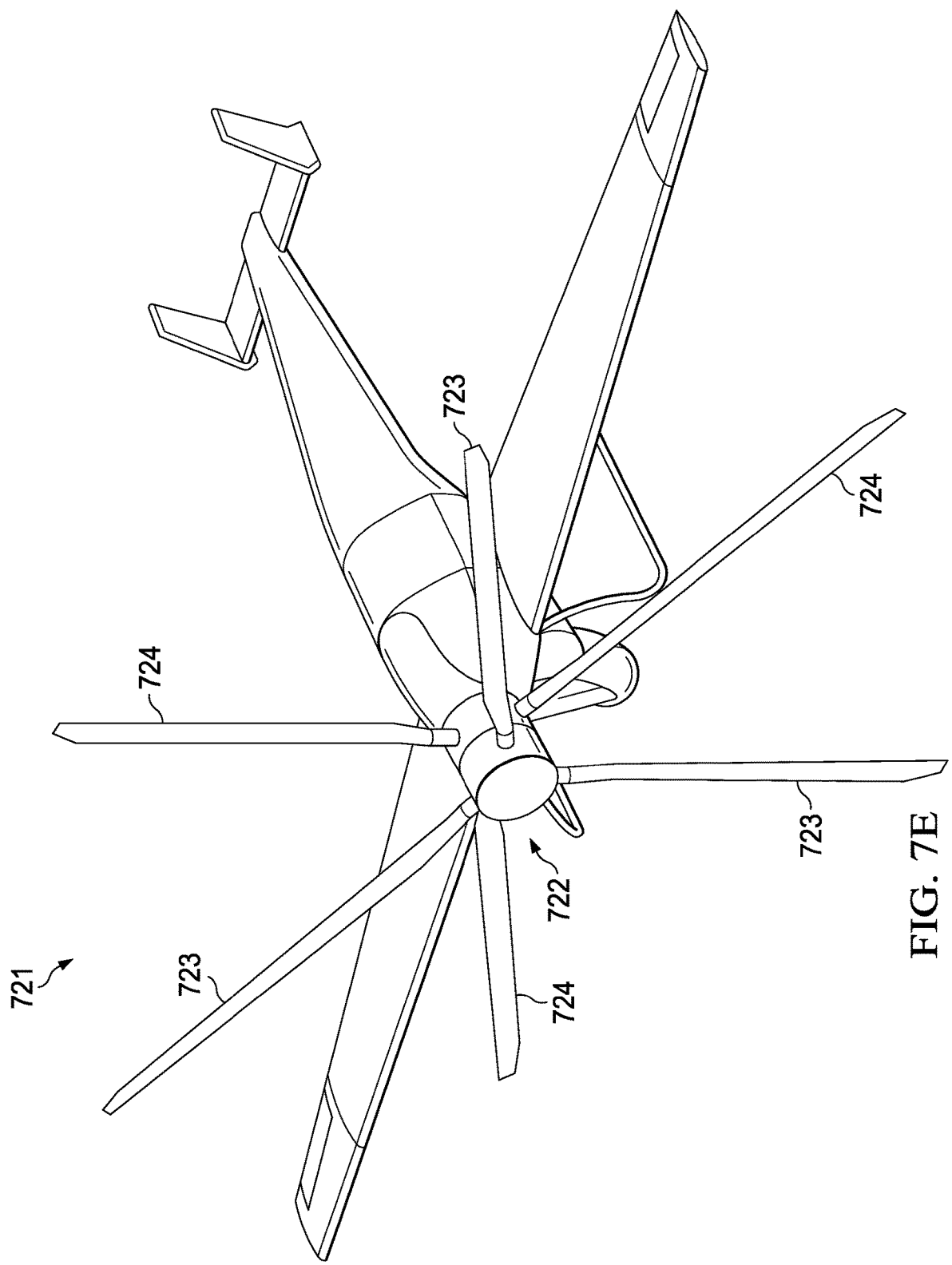

FIG. 7E depicts a single, centerline tiltrotor aircraft 721 having a coaxial proprotor assembly 722. One set of rotor blades 723 may rotate in a clockwise direction, while the other set of rotor blades 724 rotates in a counterclockwise direction. The torques generated by each set of rotor blades offset each other when operating in either airplane mode or helicopter mode. As a result, when operating in helicopter mode, aircraft 721 does not require a separate anti-torque system, such as a tail rotor, EDAT, or PATS.

Figure 7F:
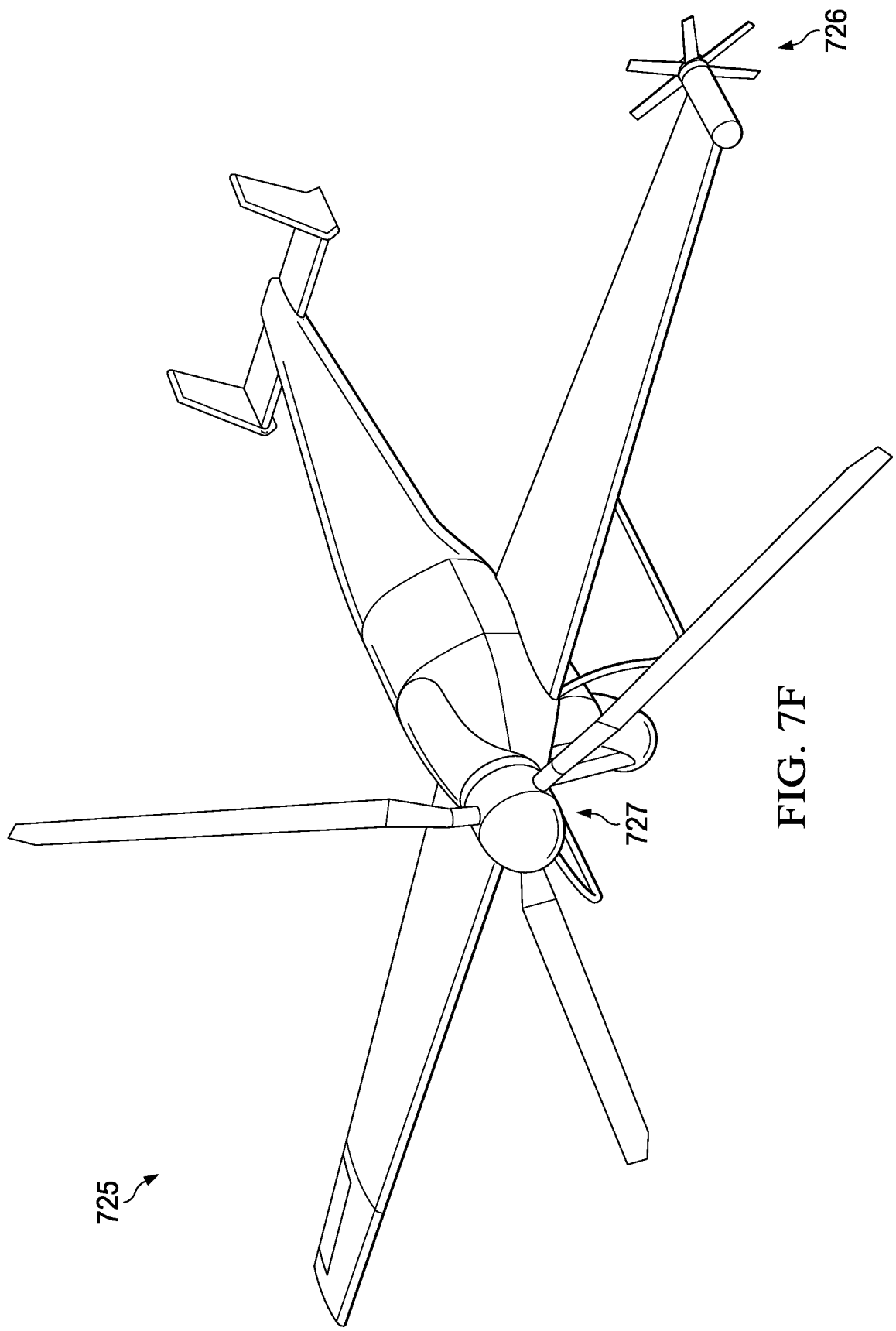

FIG. 7F depicts a single, centerline tiltrotor aircraft 725 having a wingtip-mounted anti-torque system 726. When aircraft 725 is operating in a helicopter mode, wingtip-mounted anti-torque system 726 generates a force to oppose the torque created by proprotor 727. In one embodiment, anti-torque system 726 may be a propeller-based system that generates a force opposite the direction of rotation of the proprotor 727. Alternatively, anti-torque system 726 may be a PATS or other system that uses air flow to counteract proprotor torque.

A flight control computer or other device may control and manage the anti-torque systems, such as a tail rotor, EDAT, or PATS. During helicopter mode flight, the flight control computer may manage the anti-torque system to generate sufficient anti-torque force to counter the torque generated by the main rotor and to prevent aircraft yaw motion. The flight control computer may also receive yaw inputs from a pilot, autopilot, or remote control system that require adjustment of the anti-torque system to allow aircraft rotation around the vertical axis in the helicopter flight mode. During transition into and out of airplane mode, the aircraft will need less anti-torque input the more the proprotor is rotated forward. Accordingly, the flight control computer or anti-torque system may automatically manage the amount of anti-torque force generated during such transitions to maintain the desired aircraft attitude.

Figure 7G:
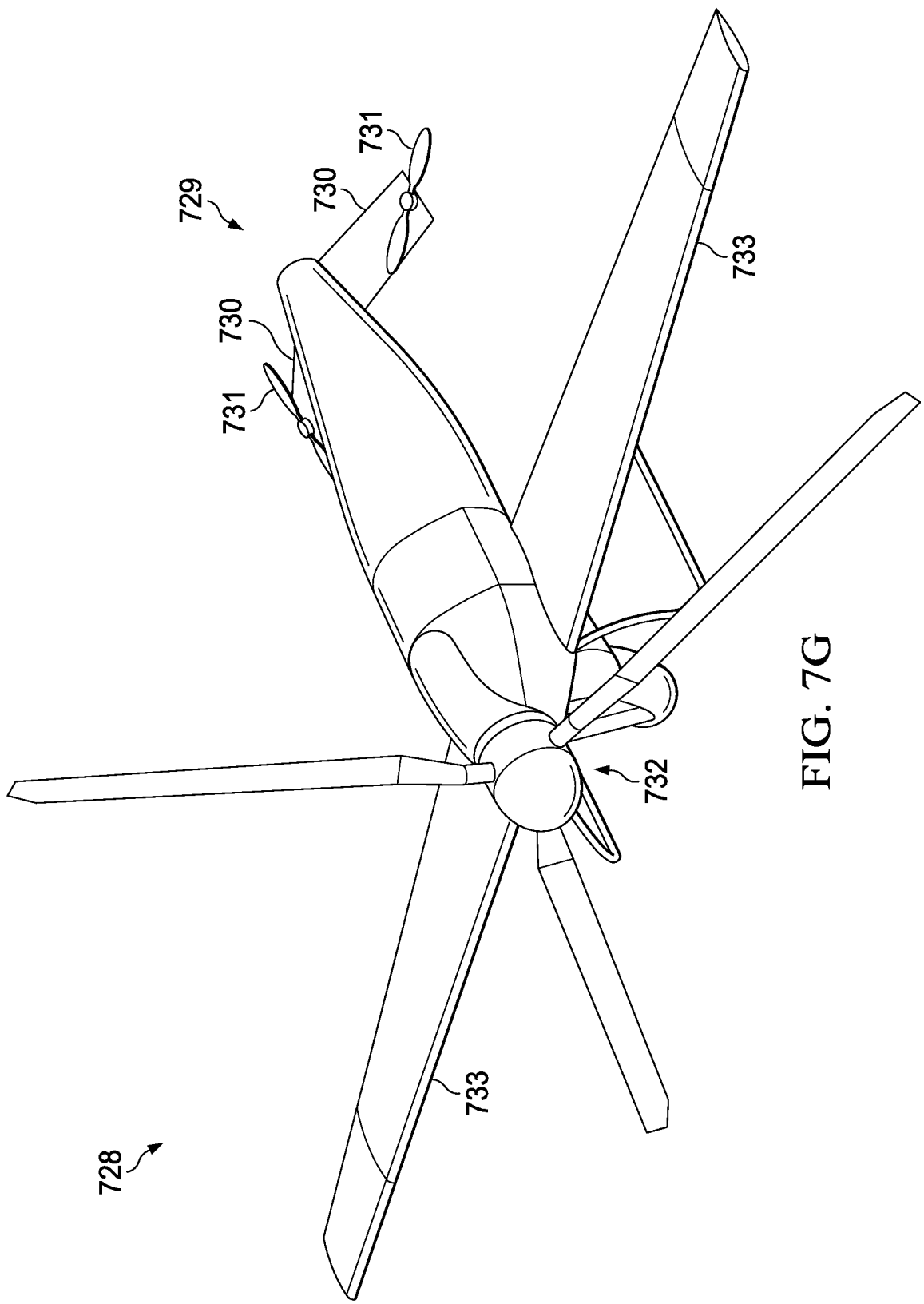

FIG. 7G depicts a single, centerline tiltrotor aircraft 728 having a V-tail configuration 729 comprising two angled stabilizers 730. Although shown as angled downward in FIG. 7G, it will be understood that in other configurations the stabilizers 730 may be angled in an upward direction. Stabilizers 730 provide control of pitch and yaw motion during flight in airplane mode.

Aircraft 728 also has counterbalancing rotors 731 that are configured to compensate for changes in the center of gravity (CG) and to maintain a level attitude for aircraft 728. In some embodiments, when the proprotor 732 on aircraft 728 moves between the horizontal (airplane mode) and vertical (helicopter mode) positions, the CG may shift forward or aft along the fuselage of aircraft 728 depending upon the selected flight mode. The relationship between the aircraft's CG and the lift force applied to the aircraft may cause the aircraft's tail or nose to droop.

For example, the CG on aircraft 728 may shift forward during airplane mode when proprotor 732 is horizontal. The lift force during airplane mode is generated by wings 733, which are the center of lift. If the CG is forward of the center of lift, then horizontal tail stabilizers 730 create a tail down force during forward flight to a level flight attitude. On the other hand, the CG on aircraft 728 may shift aft during helicopter mode when proprotor 732 is vertical. Proprotor 732 is the nominal center of lift during helicopter flight mode. If the CG shifts aft of the center of lift, then counterbalancing rotors 731 may generate a secondary lift force to raise the tail section to maintain level flight attitude.

In one embodiment, rotors 731 may provide active CG management to maintain aircraft CG within a desired range under the control of a flight control computer or other device. For example, as the aircraft transitions between helicopter and airplane modes, the flight control computer manages the lift generated by the counterbalancing rotors 731 to maintain a level aircraft attitude.

Figure 8A:
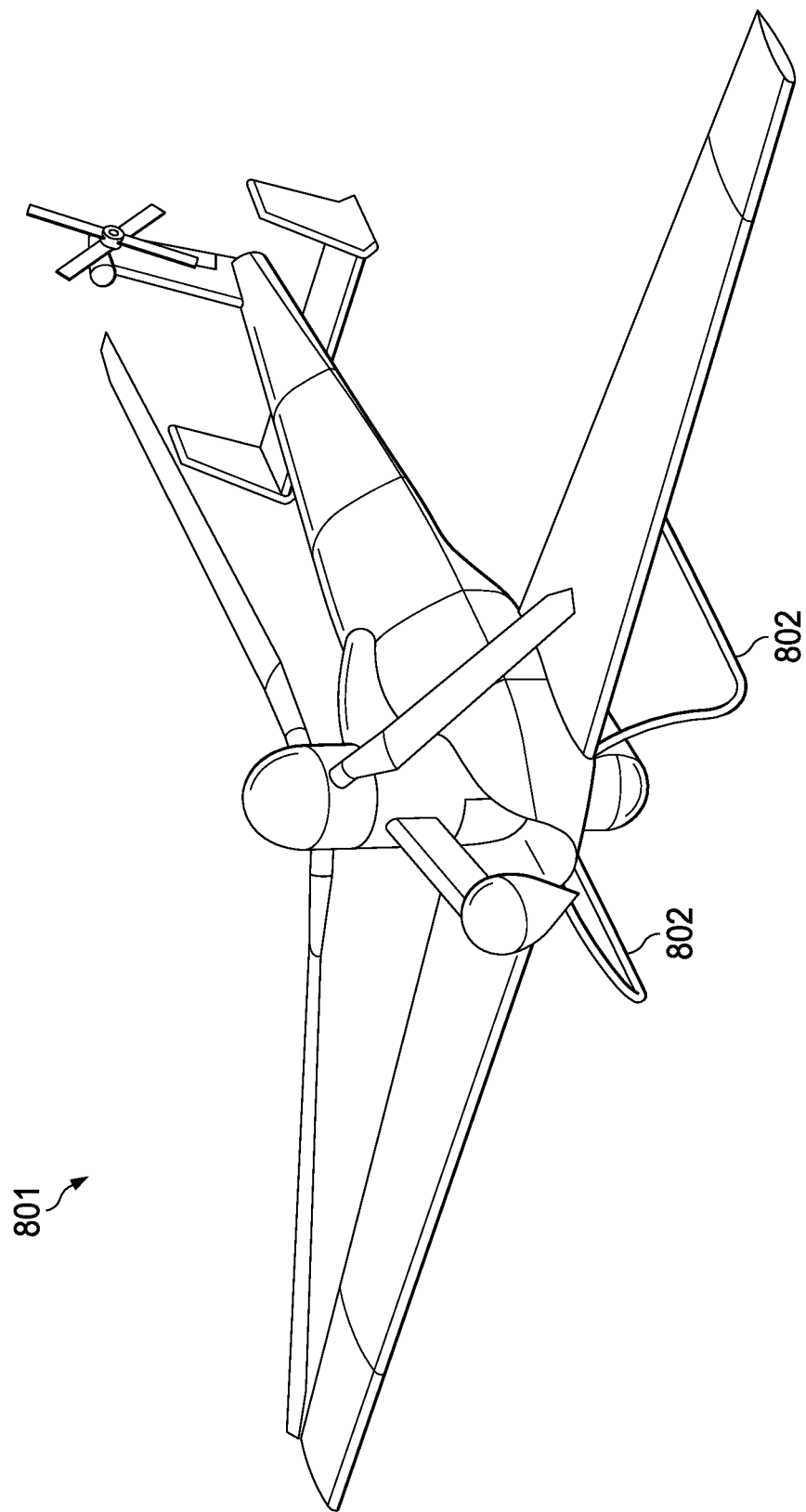
Figure 8B:
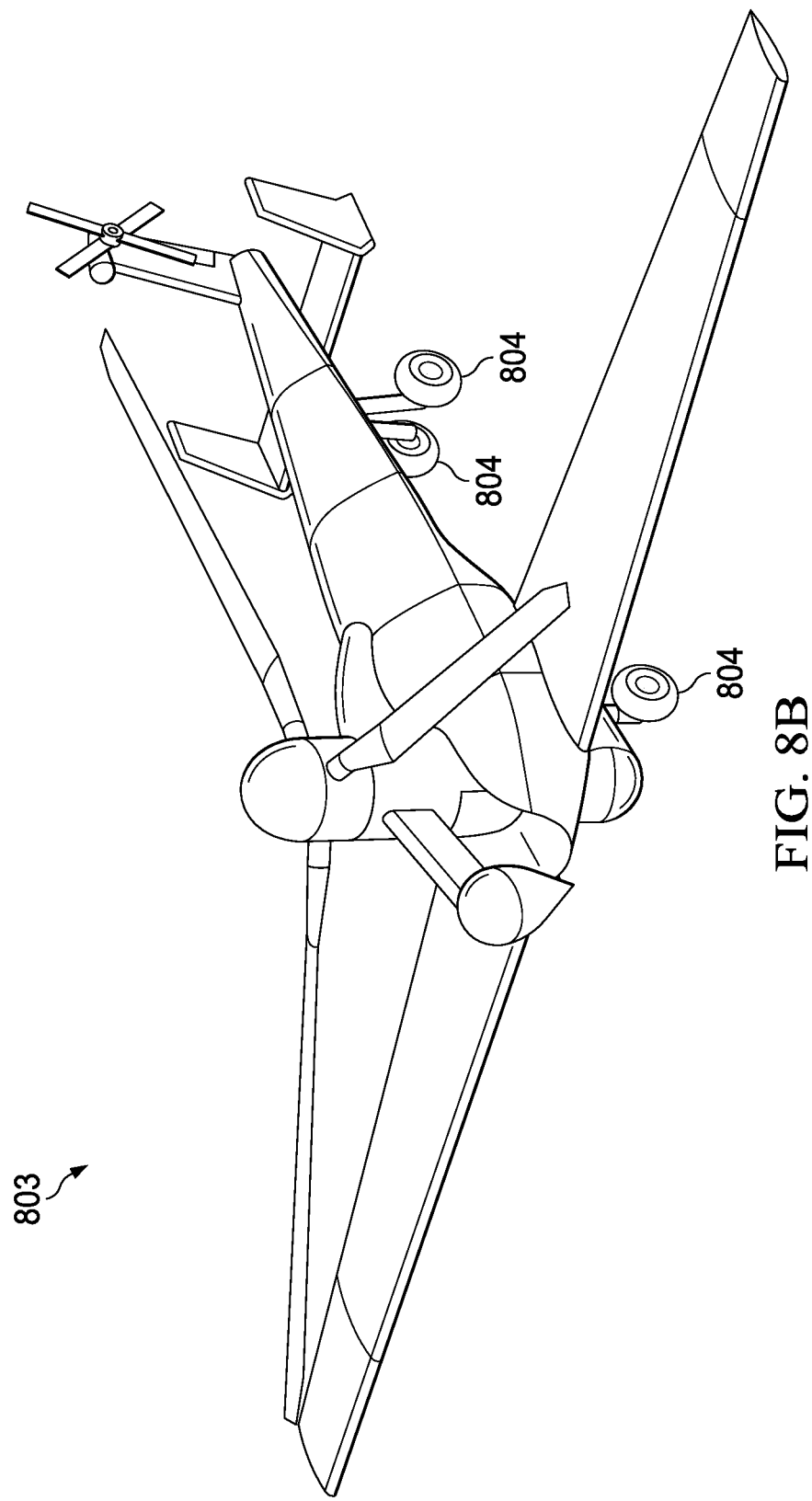
Figure 8C:
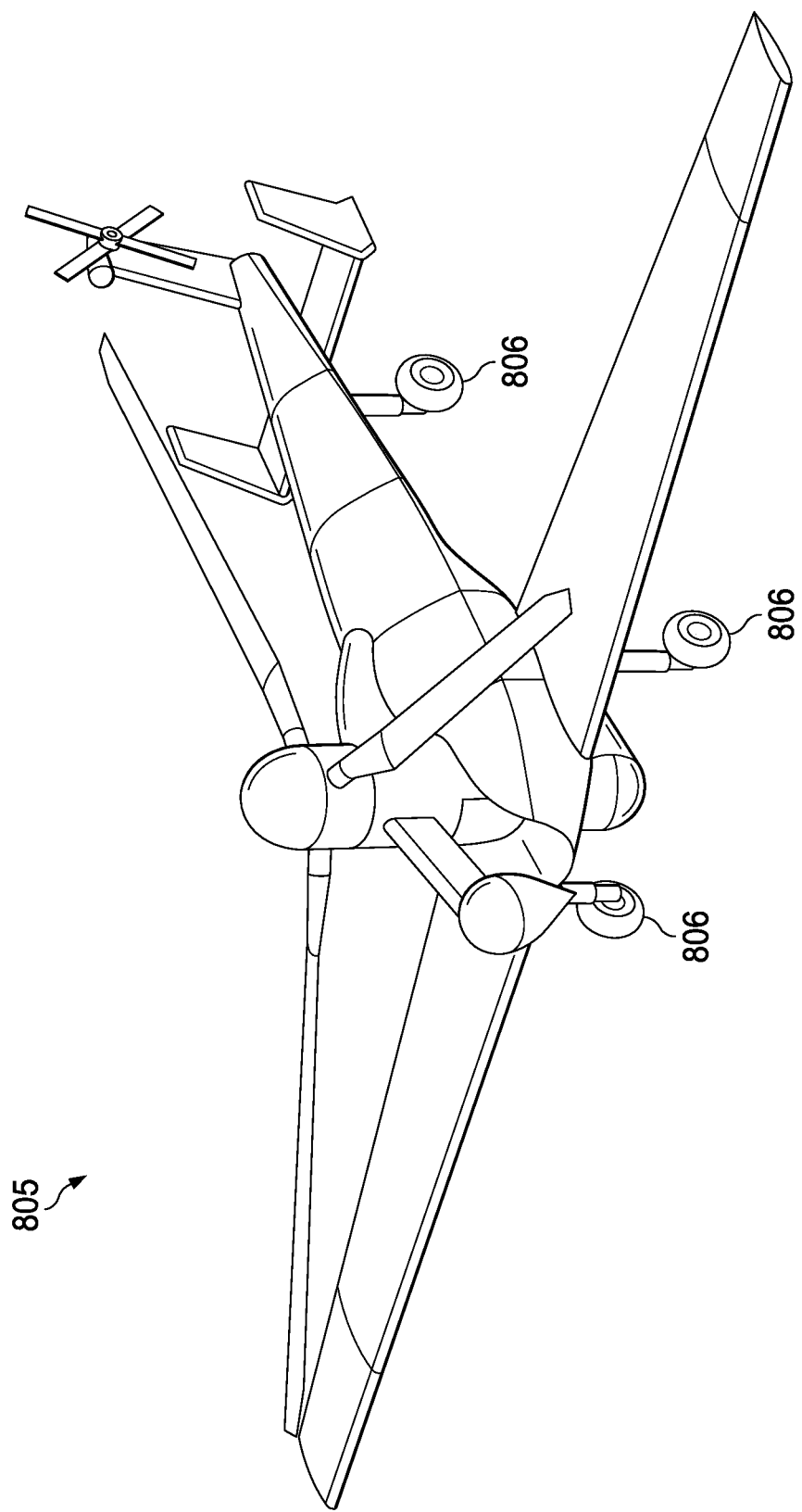
Figure 8D:
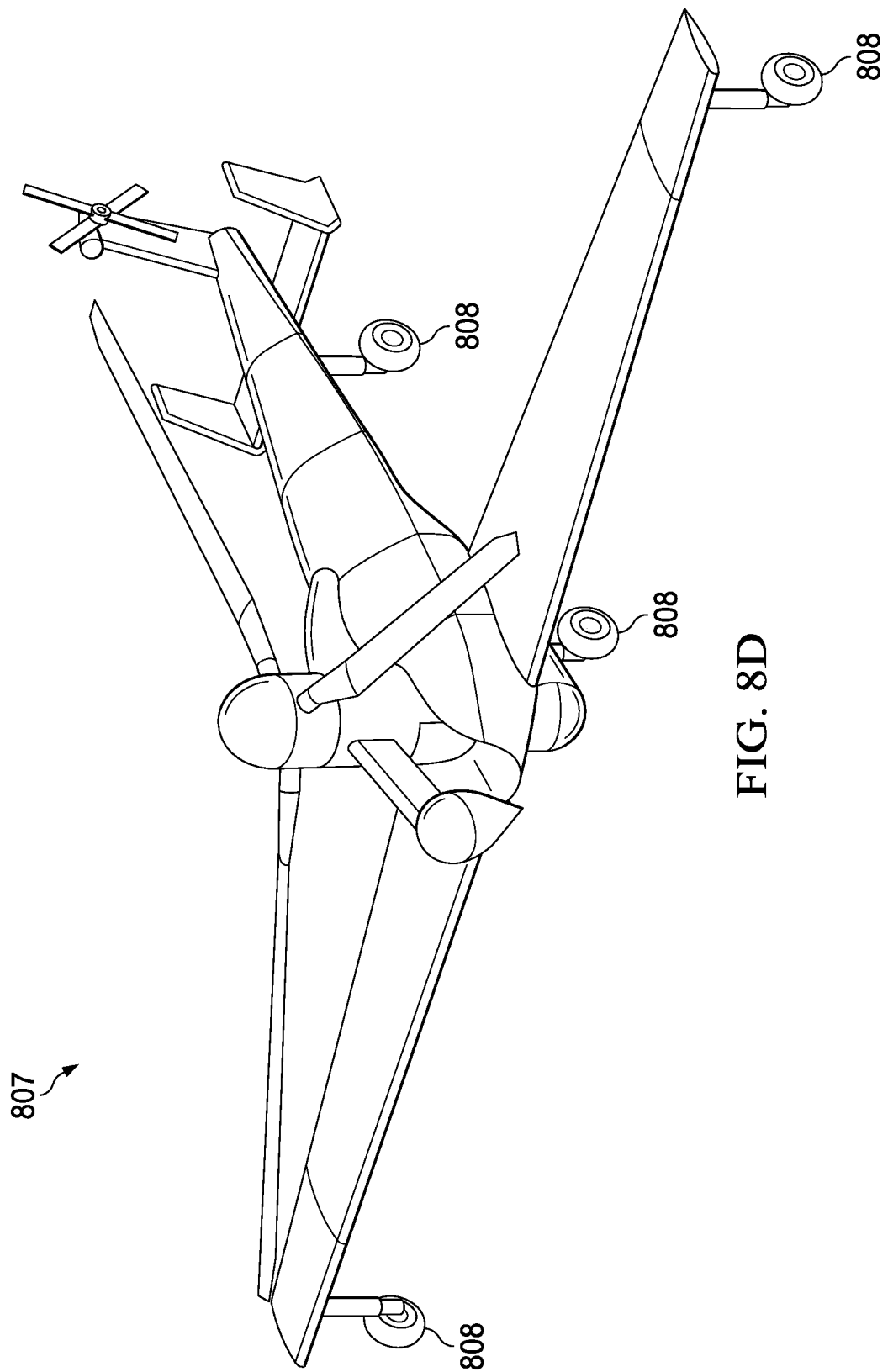

FIGS. 8A-D depict various landing gear options available for a single, centerline tiltrotor aircraft. In FIG. 8A, aircraft 801 has skids or runners 802 that are configured to support the aircraft's weight while on the ground, but generally do not allow for ground taxi. In some embodiments, skids 802 may be water-tight float structures that provide buoyancy so that aircraft 801 can land on water. In FIG. 8B, aircraft 803 has three landing gear 804 in a single nose gear configuration. In FIG. 8C, aircraft 805 has three landing gear 808 in a tail dragger configuration. FIG. 8D depicts aircraft 807 with four landing gear 808 mounted both on the wings and fuselage. In some embodiments, landing gear 802, 804, 806, and/or 808 may have wheels or rollers that allow aircraft 803 to ground taxi. Additionally, in some embodiments, landing gear 802, 804, 806, and/or 808 may be retractable and the landing gear may be stowed against or inside the aircraft fuselage and/or wings to improve the aircraft's aerodynamic profile. It will be understood that a single, centerline tiltrotor aircraft may use any landing gear configuration, including no landing gear (i.e., resting on the fuselage itself), and is not limited to the example shown in FIGS. 8A-D.

Figure 9A:
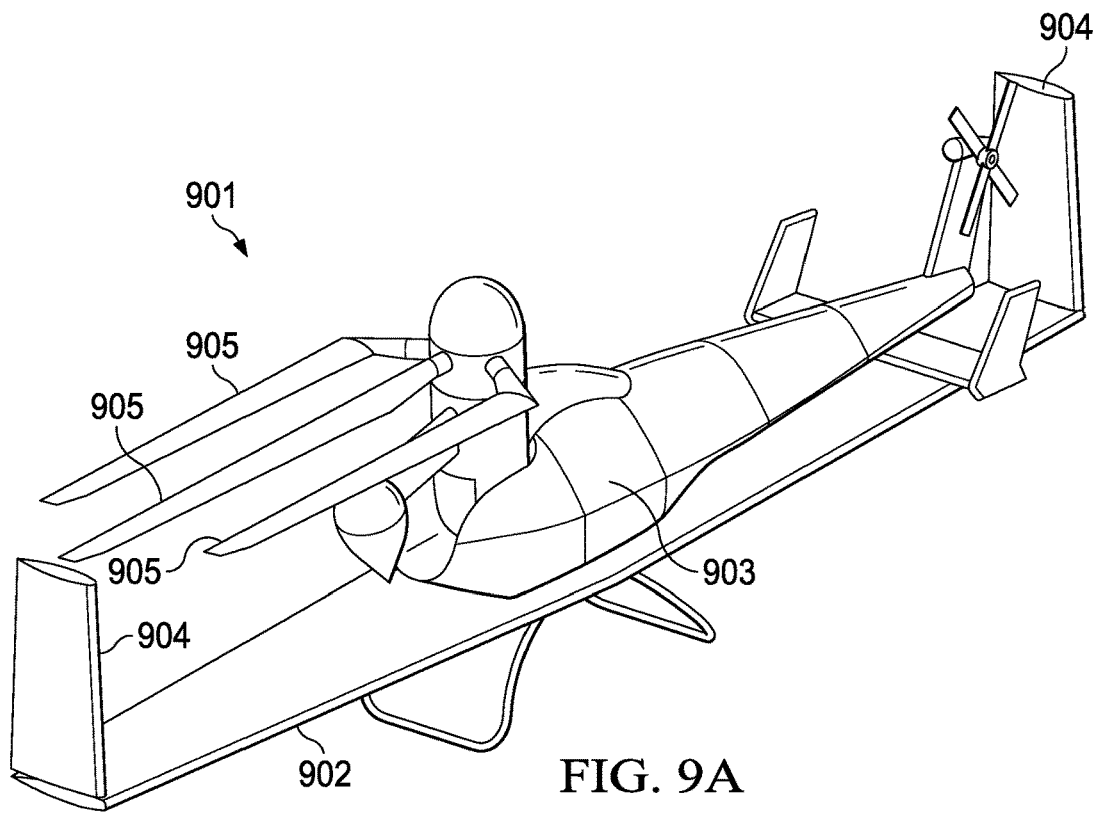

FIGS. 9A-E depict various wing fold and stow configurations for a single, centerline tiltrotor aircraft. The wings, tail, and/or rotor blades on a centerline tiltrotor aircraft may be folded or otherwise stowed when the aircraft is not in use to reduce the space needed for storage and parking of the aircraft. FIG. 9A depicts aircraft 901 having a wing 902 that is rotated 90 degrees and is aligned with fuselage 903. Additionally, one or more wingtips 904 may be folded to reduce the overall length of the wing when not in use. One or more rotor blades 905 may also be folded or rotated out of an operating position to align with wing 902 and/or fuselage 903 to further reduce the area required to store aircraft 901.

Figure 9B:
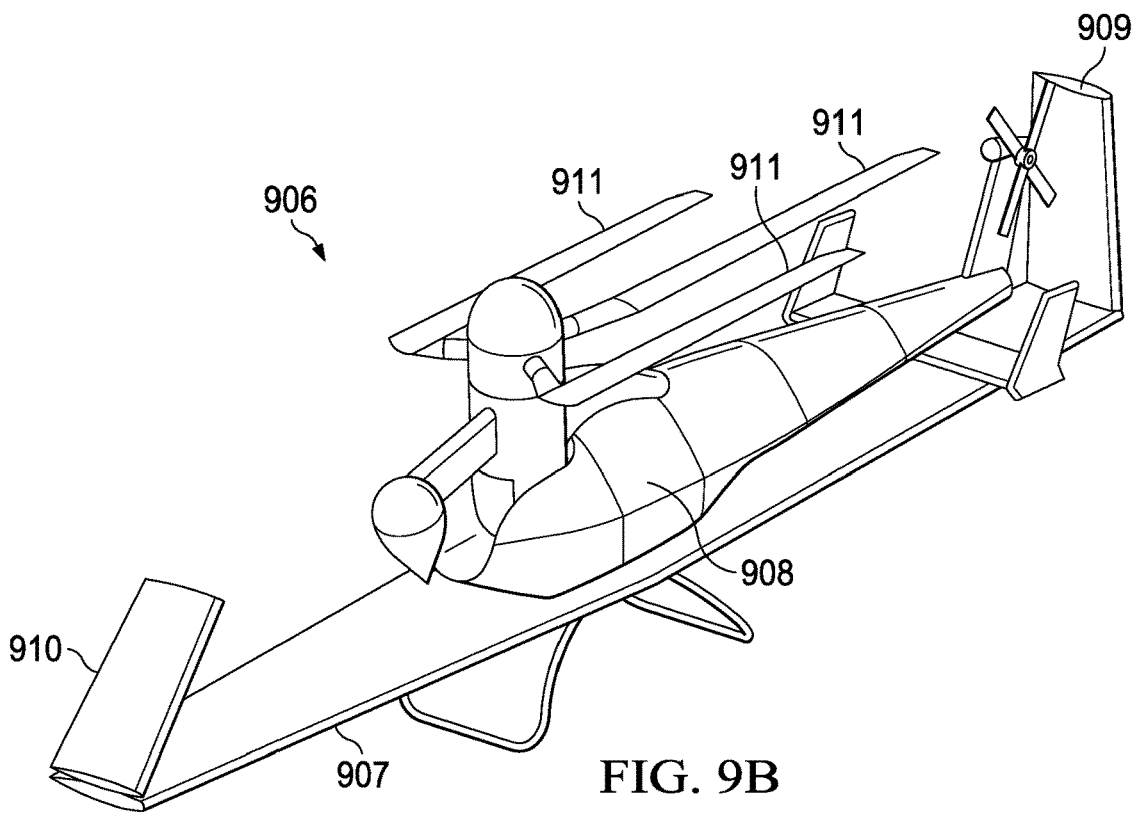

FIG. 9B depicts aircraft 906 having wing 907 that is rotated 90 degrees and is aligned with fuselage 908. Additionally, wingtips 909 and 910 are folded to reduce the overall length of the wing when not in use. As illustrated in FIG. 9B, wingtip 909 is folded into a generally vertical position, while wingtip 910 is folded beyond the vertical position. Rotor blades 911 are folded to align with wing 907 and fuselage 908 to further reduce the area required to store aircraft 906.

Figure 9C:
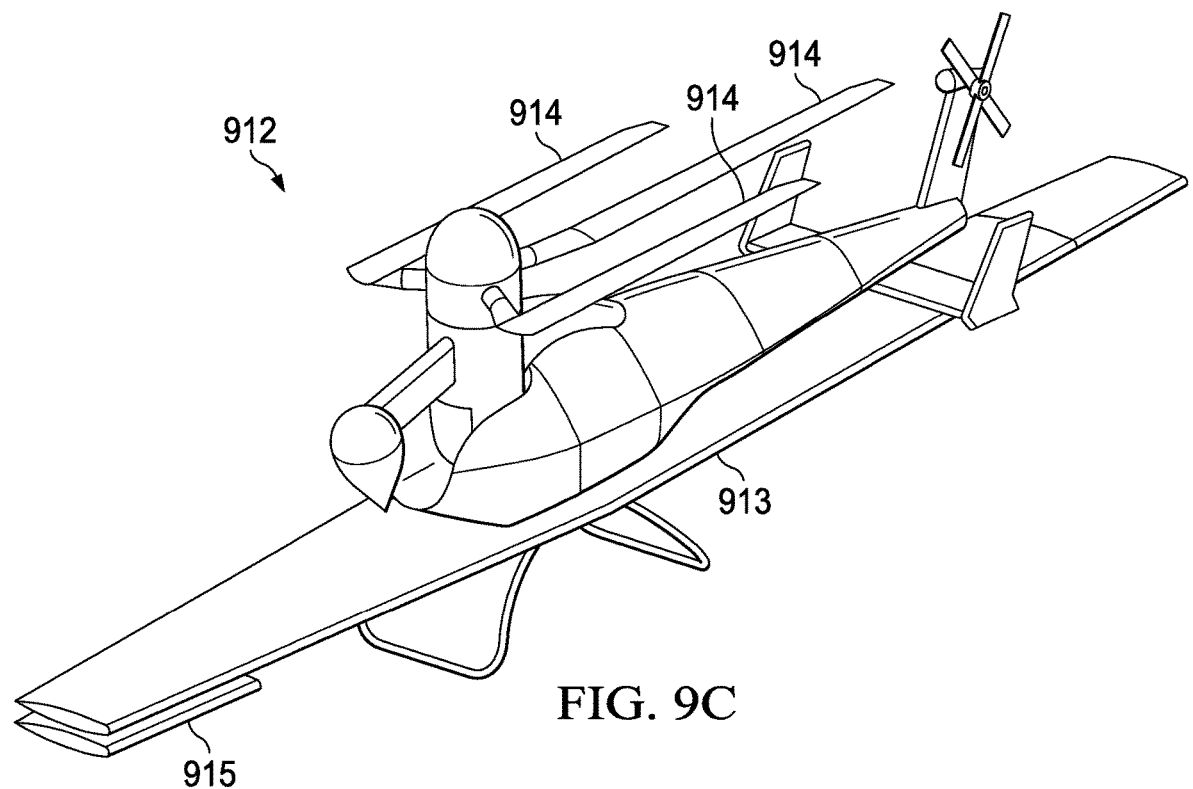

FIG. 9C depicts aircraft 912, which has a folded wing 913 and rotors 914 similar to FIGS. 9A and 9B. On aircraft 912, the wingtip section 915 has been folded below wing 913 for storage, while the opposite wingtip has not been folded.

Figure 9D:
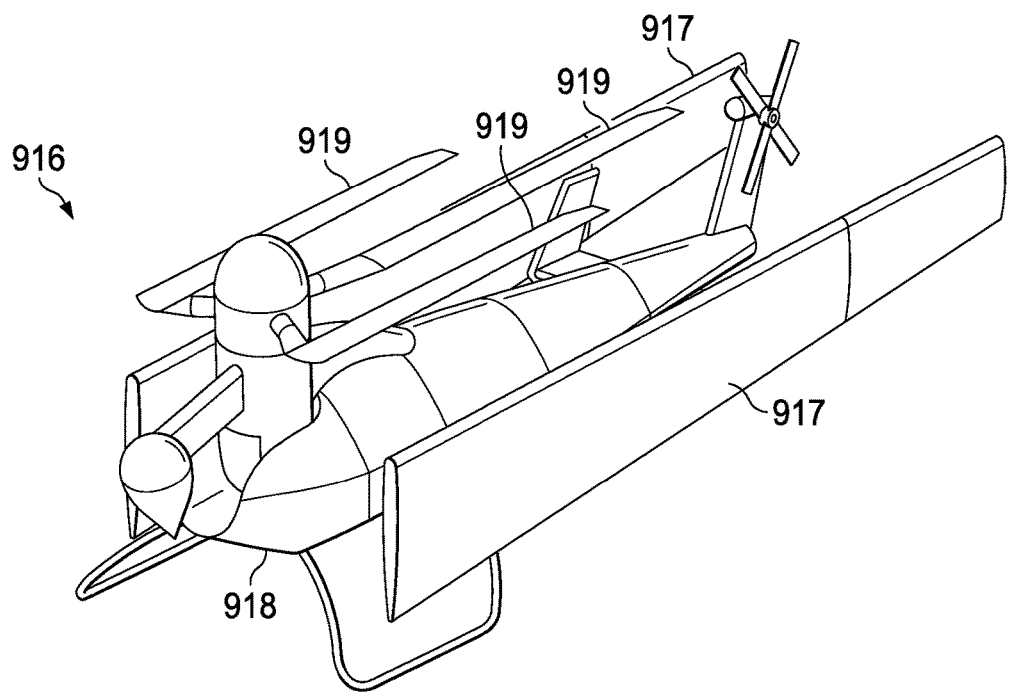

FIG. 9D depicts aircraft 916 having wings sections 917 that are rotated and folded back against fuselage 918. In other embodiments, wing sections 917 may be swept back along fuselage 918. Rotors 919 may also be folded back to parallel fuselage 918.

Figure 9E:
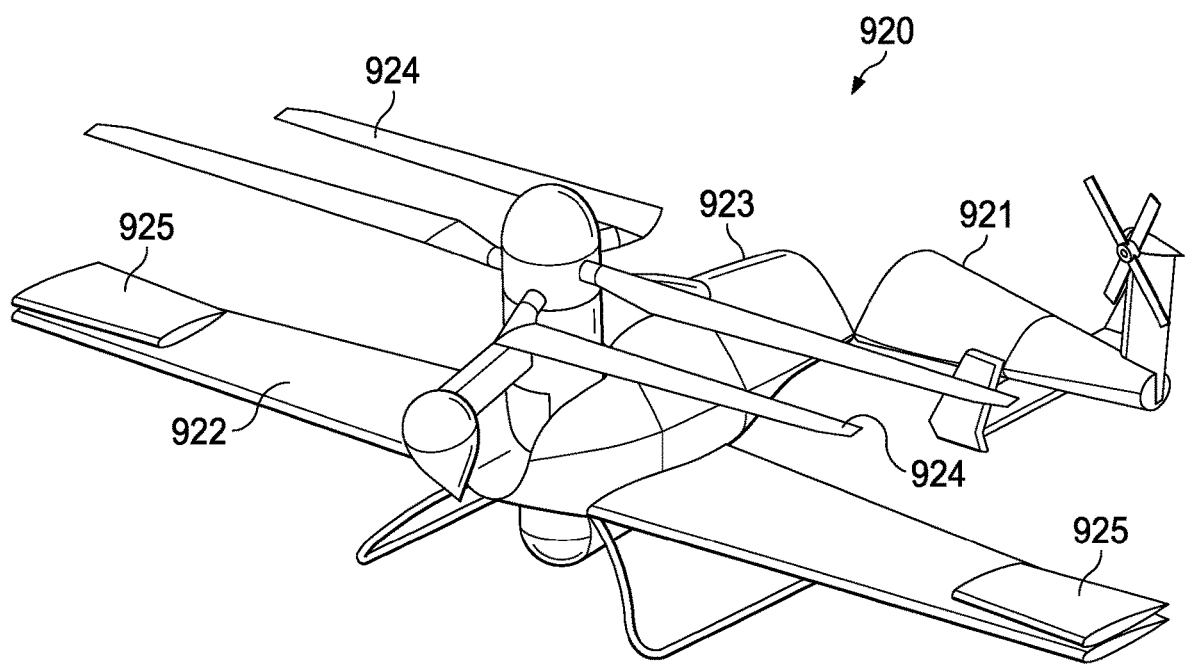

FIG. 9E depicts aircraft 920 having an empennage section 921 that is folded to a position generally parallel to wing 922. The wing 922 has remained in a fixed position relative to fuselage 923. One or more rotors 924 may also be folded to align with wing 922. Wingtip sections 925 may also be folded to reduce the overall length of the wing while not in use.

In an example embodiment, a rotorcraft comprises a body having a longitudinal axis, a wing coupled to the body, a single tiltrotor assembly pivotally coupled to the body, the tiltrotor assembly configured to move between a position generally perpendicular to the longitudinal axis during a vertical flight mode and a position generally parallel to the longitudinal axis during a horizontal flight mode, and an anti-torque system configured to counteract torque generated by the tiltrotor assembly during vertical flight. The anti-torque system may be further configured to generate a variable anti-torque force that is at a maximum during the vertical flight mode and at a minimum during the horizontal flight mode. The anti-torque system may comprise one or more of an open tail rotor, a protected tail rotor, an electric distributed anti-torque system, a propulsive anti-torque system, and/or a wingtip anti-torque system.

The rotorcraft may further comprise a center of gravity compensation system that is configured to manage a rotorcraft center of gravity during movement of the tiltrotor assembly between the vertical flight mode and the horizontal flight mode. The center of gravity compensation system may be a counterweight configured to counterbalance movement of the tiltrotor assembly. The counterweight may comprise at least a portion of a propulsion system and/or mission equipment, such as ordnance, weapons, targeting equipment, sensors, countermeasures, drop tanks, cameras, or searchlight systems.

The tiltrotor assembly comprises a proprotor and a propulsion system. In one embodiment, the proprotor moves between a vertical flight mode position and a horizontal flight mode position, and the propulsion system is fixedly mounted in the body. In other embodiments, the proprotor and the propulsion system move together between a vertical flight mode position and a horizontal flight mode position.

In another embodiment, a rotorcraft comprises a body having a longitudinal axis, a wing coupled to the body, a single tiltrotor assembly pivotally coupled to the body, the tiltrotor assembly configured to move between a position generally perpendicular to the longitudinal axis during a vertical flight mode and a position generally parallel to the longitudinal axis during a horizontal flight mode, and a center of gravity compensation system configured to manage a rotorcraft center of gravity during movement of the tiltrotor assembly between the vertical flight mode and the horizontal flight mode. The center of gravity compensation system may be a counterweight configured to counterbalance movement of the tiltrotor assembly. The counterweight may comprise at least a portion of a propulsion system or mission equipment.

The rotorcraft may further comprise an anti-torque system configured to counteract torque generated by the tiltrotor assembly during vertical flight. The anti-torque system may be further configured to generate a variable anti-torque force that is at a maximum during the vertical flight mode and at a minimum during the horizontal flight mode. The anti-torque system may comprise one or more of an open tail rotor, a protected tail rotor, an electric distributed anti-torque system, a propulsive anti-torque system, and a wingtip anti-torque system.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A rotorcraft, comprising:
    a body having a longitudinal axis;
    a wing coupled to the body;
    a single tiltrotor assembly pivotally coupled to the body, the tiltrotor assembly configured to move between a position perpendicular to the longitudinal axis during a vertical flight mode and a position parallel to the longitudinal axis during a horizontal flight mode; and
    a center of gravity compensation system configured to manage a rotorcraft center of gravity during movement of the tiltrotor assembly between the vertical flight mode and the horizontal flight mode, the center of gravity compensation system comprising a cantilever beam supporting a counterweight that is forward of the tiltrotor assembly when in the vertical flight mode and beneath the tiltrotor assembly when in the horizontal flight mode.

2. The rotorcraft of claim 1, further comprising an anti-torque system configured to counteract torque generated by the tiltrotor assembly during vertical flight, wherein the anti-torque system is further configured to generate a variable anti-torque force that is at a maximum during the vertical flight mode and at a minimum during the horizontal flight mode.

3. The rotorcraft of claim 1, further comprising an anti-torque system configured to counteract torque generated by the tiltrotor assembly during vertical flight, wherein the anti-torque system comprises one or more of an open tail rotor, a protected tail rotor, an electric distributed anti-torque system, a propulsive anti-torque system, and a wingtip anti-torque system.

4. The rotorcraft of claim 1, wherein the center of gravity compensation system comprising a gearbox that is moved forward when the tiltrotor assembly is rotated to the vertical flight mode and rearward when the tiltrotor assembly is rotated to the horizontal flight mode.

5. The rotorcraft of claim 1, wherein the counterweight is configured to counterbalance movement of the tiltrotor assembly.

6. The rotorcraft of claim 5, wherein the counterweight comprises at least a portion of a propulsion system.

7. The rotorcraft of claim 5, wherein the counterweight comprises mission equipment.

8. The rotorcraft of claim 1, wherein the tiltrotor assembly comprises:
    a proprotor; and
    a propulsion system.

9. The rotorcraft of claim 8, wherein the proprotor moves between a vertical flight mode position and a horizontal flight mode position, and wherein the propulsion system is fixedly mounted in the body.

10. The rotorcraft of claim 8, wherein the proprotor and the propulsion system move together between a vertical flight mode position and a horizontal flight mode position.

11. A rotorcraft, comprising:
    a body having a longitudinal axis;
    a wing coupled to the body;
    a single tiltrotor assembly pivotally coupled to the body, the tiltrotor assembly configured to move between a position perpendicular to the longitudinal axis during a vertical flight mode and a position parallel to the longitudinal axis during a horizontal flight mode; and
    a center of gravity compensation system configured to manage a rotorcraft center of gravity during movement of the tiltrotor assembly between the vertical flight mode and the horizontal flight mode, the center of gravity compensation system comprising a gearbox that is moved forward when the tiltrotor assembly is rotated to the vertical flight mode and rearward when the tiltrotor assembly is rotated to the horizontal flight mode.

12. The rotorcraft of claim 11, wherein the center of gravity compensation system comprises a counterweight that is configured to counterbalance movement of the tiltrotor assembly.

13. The rotorcraft of claim 12, wherein the counterweight comprises at least a portion of a propulsion system.

14. The rotorcraft of claim 12, wherein the counterweight comprises mission equipment.

15. The rotorcraft of claim 11, further comprising:
    an anti-torque system configured to counteract torque generated by the tiltrotor assembly during vertical flight.

16. The rotorcraft of claim 15, wherein the anti-torque system is further configured to generate a variable anti-torque force that is at a maximum during the vertical flight mode and at a minimum during the horizontal flight mode.

17. The rotorcraft of claim 15, wherein the anti-torque system comprises one or more of an open tail rotor, a protected tail rotor, an electric distributed anti-torque system, a propulsive anti-torque system, and a wingtip anti-torque system.

18. The rotorcraft of claim 11, wherein the tiltrotor assembly comprises:
    a proprotor; and
    a propulsion system.

19. The rotorcraft of claim 18, wherein the proprotor moves between a vertical flight mode position and a horizontal flight mode position, and wherein the propulsion system is fixedly mounted in the body.

20. The rotorcraft of claim 18, wherein the proprotor and the propulsion system moves together between a vertical flight mode position and a horizontal flight mode position.

* * * * *